(12) United States Patent
Carroll

(10) Patent No.: US 12,091,881 B1
(45) Date of Patent: Sep. 17, 2024

(54) VEHICLE OCCUPANCY REMINDER FLAP FOR EXITING DRIVER

(71) Applicant: Debra Carroll, Pearl River, NY (US)

(72) Inventor: Debra Carroll, Pearl River, NY (US)

( * ) Notice: Subject to any disclaimer, the term of this patent is extended or adjusted under 35 U.S.C. 154(b) by 0 days.

(21) Appl. No.: 18/643,827

(22) Filed: Apr. 23, 2024

Related U.S. Application Data

(62) Division of application No. 18/038,442, filed as application No. PCT/US2022/022084 on Mar. 28, 2022.

(60) Provisional application No. 63/175,008, filed on Apr. 14, 2021.

(51) Int. Cl.
 *E05B 13/00* (2006.01)
 *B60J 5/04* (2006.01)
 *B60R 11/00* (2006.01)

(52) U.S. Cl.
 CPC ........... *E05B 13/001* (2013.01); *B60J 5/0493* (2013.01); *B60R 11/00* (2013.01); *B60R 2011/0019* (2013.01); *B60R 2011/0049* (2013.01)

(58) Field of Classification Search
 CPC ..... B60J 5/0493; B60J 5/0495; B60R 13/013; B60R 13/0243; B60R 21/09; B60R 2011/0019; B60R 2011/0049; E05B 13/001
 USPC ............................................... 296/146.1, 152
 See application file for complete search history.

(56) References Cited

U.S. PATENT DOCUMENTS

| 2,578,547 | A | 12/1951 | Hilger |
| 2,615,754 | A | 10/1952 | Lindenberg |
| 4,118,066 | A | 10/1978 | Ricke |
| 4,236,479 | A | 12/1980 | Walker et al. |
| 4,936,244 | A | 6/1990 | Hansen et al. |
| 5,042,866 | A | 8/1991 | Cody |
| 5,058,523 | A | 10/1991 | Mikkonen et al. |
| 5,129,695 | A | 7/1992 | Norman |

(Continued)

FOREIGN PATENT DOCUMENTS

| CN | 101460691 A | 6/2009 |
| CN | 105604413 A | 5/2016 |

(Continued)

OTHER PUBLICATIONS

Wang, search report, Apr. 25, 2024, 3 pages, CNIPA, China.

(Continued)

*Primary Examiner* — Jason S Daniels
(74) *Attorney, Agent, or Firm* — David J. Rosenblum

(57) ABSTRACT

For a hanging flexible flap having a top and bottom end for reminding a driver, upon exiting, of the vehicle's occupancy for a vehicle having a driver-side door handle including a lever operable for opening the door, deployment, proceeding from a pre-deployment state in which the flap is in a folded-up configuration such that the bottom end is releasably attached to a second interior-side location vertically above a first interior-side location to which the flap is attached and both locations are vertically above the lever and jointly high enough that the flap does not cover the lever along at least most of the lever's length, includes undoing the releasable attachment; and unfolding the flap, or letting it fall, to hang down covering the lever along at least most of the lever's length. Alternatively, pre-deployment may be in a spring-biased rolled-up configuration, with the flap unrollable down to cover the lever.

5 Claims, 14 Drawing Sheets

(56) References Cited

U.S. PATENT DOCUMENTS

| | | | |
|---|---|---|---|
| 5,133,585 | A | 7/1992 | Hassan |
| 6,523,880 | B1 | 2/2003 | Yako |
| 6,870,472 | B2 | 3/2005 | Gift et al. |
| 6,938,832 | B2 | 9/2005 | Sada |
| 7,108,301 | B2 | 9/2006 | Louvel |
| 7,121,610 | B2 | 10/2006 | Nguyen |
| 7,265,306 | B2 * | 9/2007 | Radu .................. H01H 9/22 |
| | | | 200/333 |
| 7,966,109 | B2 | 6/2011 | Desjardins |
| 8,395,511 | B2 | 3/2013 | Desjardins |
| 8,408,156 | B2 | 4/2013 | Banda |
| 8,663,535 | B2 | 3/2014 | Larcom et al. |
| 8,727,397 | B1 | 5/2014 | McDonald |
| 8,892,302 | B1 | 11/2014 | McDonald |
| 2005/0091892 | A1 | 5/2005 | Dang |
| 2005/0099285 | A1 | 5/2005 | Prevatt et al. |
| 2007/0220793 | A1 * | 9/2007 | Mappes ............... G09F 3/203 |
| | | | 40/593 |
| 2010/0225487 | A1 | 9/2010 | Desjardins |
| 2014/0300461 | A1 | 10/2014 | Stark |
| 2016/0208516 | A1 | 7/2016 | Dearman |
| 2018/0361927 | A1 | 12/2018 | Debowski |
| 2019/0234122 | A1 | 8/2019 | Löw et al. |
| 2019/0248286 | A1 | 8/2019 | Maxwell et al. |
| 2020/0406749 | A1 | 12/2020 | Rozier |
| 2021/0280377 | A1 | 9/2021 | Gauthier |
| 2024/0044170 | A1 * | 2/2024 | Carroll ............... B60J 5/0493 |

FOREIGN PATENT DOCUMENTS

| | | |
|---|---|---|
| CN | 105620354 A | 6/2016 |
| CN | 107408327 A | 11/2017 |
| CN | 107839644 A | 3/2018 |
| CN | 109131074 A | 1/2019 |
| CN | 208306491 | 1/2019 |
| DE | 4321189 A1 | 1/1995 |
| WO | 2018184069 | 10/2018 |

OTHER PUBLICATIONS

Wang, first office action, Apr. 25, 2024, 3 pages, CNIPA, China.

Rosenblum, concise explanation of relevance of Chinese first office action, May 21, 2024, 1 page, US.

Healthline, What's the Average Hand Size for Men, Women, and Children?, 1 page, [retrieved on Jan. 23, 2020]. Retrieved from the Internet <URL: https://www.healthline.com/health/average-hand-size#adults>.

carparts.com, Interior Door Handle Buyer's Guide, 1 page, [retrieved on Feb. 4, 2020]. Retrieved from the Internet <URL: https://www.carparts.com/interior-door-handle>.

carseatangel.com, Car Seat Angel on Board, 1 page, [retrieved on Sep. 28, 2019]. Retrieved from the Internet <URL: https://www.carseatangel.com/Welcome.html>.

amazon.com, Hot Car Reminder Hanger by Eyez See You Baby, 1 page, [retrieved on Sep. 28, 2019]. Retrieved from the Internet <URL: https://www.amazon.com/Hot-Car-Reminder-Window-Hanger/dp/B0763K6C13/ref=sr_1_8?keywords=baby+in+car+reminder&qid=1569647698&sr=8-8>.

Grainger, Flexible Magnets, 1 page, [retrieved on Apr. 23, 2021]. Retrieved from the Internet <URL: https://www.grainger.com/search/hardware/magnets-and-magnetic-strips/flexible-magnets?tv_optin=true&searchQuery=Magnetic+Strips&ef_id=Cj0KCQjw4lmEBhDFARIsAGOTMj8xRvzcj_ocWozGql31x0CDW6sb--AlijjOn7dyU0FwTjbWjnKJI0QaAiITEALw_wcB%3AG%3As&s_kwcid=AL%212966%213%21254612839877%21b%21%21s%21%21%2Bmagnetic+%2Bstrips&gucid=N%3AN%3APS%3APaid%3AGGL%3ACSM-2296%3AHVSA7Q%.

Durocher, Greg, Safe Ride for 4 Kids, 1 page, Jul. 11, 2019, [retrieved on Sep. 28, 2019]. Retrieved from the Internet <URL: https://saferide4kids.com/blog/hot-car-deaths-need-know/>.

amazon.com, Eyez See You Baby, Look Before You Lock Hot Car Baby Safety Reminder, 1 page, [retrieved on Sep. 28, 2019]. Retrieved from the Internet <URL: https://www.amazon.com/You-Baby-Eyez-See-Fatality/dp/B07DT93HHB/ref=sr_1_7?keywords=baby+in+car+reminder&qid=1569647698&sr=8-7>.

amazon.com, Eyez See You Baby, car safety child sensor spike reminder, 1 page, [retrieved on Sep. 28, 2019]. Retrieved from the Internet <URL: https://www.amazon.com/Pack-Sensory-Reminder-Protect-Fatalities/dp/B07DTCST6L/ref=sr_1_9?keywords=baby+in+car+reminder&qid=1569647698&sr=8-9>.

First4magnets, MagFlex® 12.7mm Wide Flexible Magnetic Tape—Premium Self Adhesive, 1 page, [retrieved on Apr. 23, 2021]. Retrieved from the Internet <URL: https://www.first4magnets.com/self-adhesive-c88>.

MagneticConceptsCorp., Magnetic Tape Self-Adhesive, 1 page, [retrieved on Apr. 23, 2021]. Retrieved from the Internet <URL: https://www.magneticconcepts.com/accessories/magnetic-accessories/magnetic-tape?gclid=Cj0KCQjw4lmEBhDFARIsAGOTMj9Kd4bTmmHGs5NUSgXIGnPxG_Df1wdE6nSluONJCu_KHZwmAAG-XScaAjQ2EALw_wcB>.

Huffington Post, Bologna, Caroline, Middle School Boy's Genius Invention Could Save Babies From Hot Car Fatalities, 1 page, Dec. 6, 2017. [retrieved on Mar. 28, 2023]. Retrieved from the Internet <URL: https://www.huffpost.com/entry/middle-school-boy-invents-way-to-save-babies-from-hot-car-death_n_5529813>.

amazon.com, Bayan Car Front Side Window Sunshades Driver Side Window, 1 page, [retrieved on Mar. 237, 2020. Retrieved from the Internet <URL: https://www.amazon.com/Bayan-Window-Sunshades-Shade-Intended-Sedans-Reduce/dp/B01799J9H4>.

Wall Street Journal, Amid_Rising_Hot-Car_Deaths,_Auto_Makers_Agree_to_Back-Seat_Alerts, 1 page, [retrieved on Jul. 28, 2020 from the Internet].

fabricwholesaledirect.com, ottertex_water_proof_fabric, 1 page, [retrieved on Jan. 30, 2020]. Retrieved from the Internet <URL: https://www.fabricwholesaledirect.com/products/ottertex-solution-dyed-acrylic-waterproof-fabric>.

Velcro.com, How to Care for Velcro® Brand Products and Remove Adhesive, 1 page, [retrieved on Sep. 28, 2019]. Retrieved from the Internet <URL: https://www.velcro.com/support/care-instructions/>.

amazon.com, Eyez See You Baby, heatstroke prevention car door handle reminder, 1 page, [retrieved on Sep. 28, 2019]. Retrieved from the Internet <URL: https://www.amazon.com/Heatstroke-Eyez-See-You-Baby/dp/B07TMRZGKY/ref=sr_1_11?keywords=baby+in+car+reminder&qid=1569647698&sr=8-11>.zd Velcro.com, velcro_brand_sticky_back_for_auto, 1 page, [retrieved on Sep. 27, 2019]. Retrieved from the Internet <URL: https://www.velcro.com/products/industrial-strength//900101_sticky-back-for-auto/.

Wang, search report, CNIPA, China.

* cited by examiner

VEHICLE OCCUPANCY REMINDER FLAP FOR EXITING DRIVER

CROSS-REFERENCE TO RELATED APPLICATIONS

This application is a Divisional Patent Application of the U.S. National Stage Patent application Ser. No. 18/038,442 filed on May 23, 2023 which claims priority from the International Patent Application PCT/2022/022084 filed on Mar. 28, 2022 and from the U.S. Provisional Patent Application No. 63/175,008 filed on Apr. 14, 2021. This application claims the benefit of all the other above-mentioned applications.

FIELD OF THE INVENTION

The present invention relates to reminding a driver exiting a vehicle about any remaining passengers and, more particularly, to mechanical methods and devices for reminding.

BACKGROUND

Tragically, every year babies and toddlers are inadvertently forgotten in their car seats when the driver exits the car, resulting in deaths due to prolonged exposure to hot or cold temperatures. For example, a parent may be dropping off a number of children at different stops. Due to some distraction, the parent could exit the vehicle mistakenly under the impression that the task has been done, i.e., that all stops have been made, while the reality is that, for example, the just-completed "last" stop on the route is not the final stop. The parent could go to work or go home, and upon arrival exit the vehicle unaware that one child is still silently sitting or sleeping in his/her car seat. Likewise, in the case of a single child passenger, a preoccupied driver may forget a child upon arriving at the destination if, for example, the driver visits that destination at times unaccompanied by the child.

Two additional concerns are the security of a child seen to be alone in a car and the child's possible emotional duress.

Overwhelmingly, drivers do not believe it will ever happen to them—that they will leave a child or elderly person behind. But deaths are mounting. Many known reminding devices are electrical, complex to manufacture, costly, and expensive to retrofit to existing vehicles. One proposed solution is a door sensor/alarm reminder. If you close your back door before heading out, travel, turn off the ignition, and leave by the driver-side front door, right away or shortly afterward an alarm or beep will sound unless and until the same back door is opened. As discussed below, intermediate stops on the way to the destination could be problematic. Another idea being considered is (the possibly additional feature of) a motion detector which needs to detect sufficient child and/or driver motion near the child seat before the alarm stops, although this is more expensive to implement and, as an electrical solution, is not totally reliable.

Some rigidly-constructed mechanical reminding devices swing in the moving vehicle and have the disadvantage that they can physically distract the driver while he or she is driving. Also, when the reminding event is over or if the car is often used when there is no child occupant, it is unclear where the reminding device is to be kept without risking that it gets forgotten or misplaced, and without it becoming an inconvenience or annoyance. There exist reminding devices that block, or slow down, the driver from opening his or her door in an emergency that requires the occupants to exit the vehicle. Still other devices are of a type that the driver becomes easily accustomed to its presence without having to focus attention away from his or her thoughts. So, the device becomes less effective as a reminder.

SUMMARY

As suggested above, an overall solution to the problem of leaving behind vulnerable individuals in a car is yet to be established.

For the door sensor/alarm reminder, it is not clear that this would be practical for multi-stop trips. For example, before filling up with gasoline at the gas station, the driver typically turns off the ignition for safety. The driver often then exits to approach the gas pump, arrange for payment, select the gasoline type, lift the fuel transfer nozzle, insert it into the gas tank, etc. An alarm upon the driver's exit would be undesirable. Also, it is not clear what to do about it once the alarm sounds. One seemingly cumbersome solution would be to go through the motions of opening and closing the passenger back door, which could be the way to reset the reminder alarm for the remainder of the trip.

The motion detector described herein above is, as mentioned, relatively expensive.

In addition, existing electrical facilities, as a partial or standalone solution, can contribute to draining charge from the vehicle's battery and may face reliability issues such as electrical malfunction, the possible need for manual reset after vehicle maintenance, and replacement of a spent reminder-function-dedicated battery.

To address one or more of these concerns, what is needed is a low-cost, mechanical, effective, convenient solution that does not distract the driver while he or she is driving a vehicle, e.g., motor vehicle, and that is non-obstructive to the driver during an emergency exit from the vehicle. Proposed herein is a hanging flexible flap that interferes with but does not block manual access by a vehicle driver to the interior door handle. The flap with a single hand movement folds away "in-place" after use, but still visually serves as a reminder to reset it as an "exit interference" reminder.

In an exemplary aspect, a method for reminding a driver upon exiting the vehicle of the vehicle's occupancy pertains to a vehicle having a driver-side door designed to be opened by the driver, for instance a driver-side front door for a vehicle with three other side doors. The door has a frame and, assembled over the frame, a panel, covering, or "skin." The panel includes parts, such as plastic door moldings, on the interior side of the door. An interior door handle for exiting the vehicle is operatively connected to the door frame for opening the door although the handle is manually accessible by the driver from inside the vehicle. More generally, the driver-side door has an interior side and, on the interior side, a door handle manually accessible to the driver from inside the vehicle. The door handle includes a lever operable for opening the door for the exiting. The lever has both a pivot point at a fulcrum, and an effort endpoint. The method uses a hanging flexible flap having a top end and a bottom end. The method proceeds from a pre-deployment state in which the flap is in a folded-up configuration such that: a) the bottom end is releasably attached to a second location on the interior side that is vertically above a first location to which the flap is attached on the interior side; and b) both locations are vertically above the lever and jointly high enough to cause a fold line in the flap to be high enough that the flap does not cover the lever along at least most of the lever's length. The method includes deploying, based on the vehicle's occupancy, the flap by, starting from the pre-deployment state, undoing the releasable attachment. The method further includes then unfolding the flap, or allowing the flap to by gravity unfold, to hang down so as to cover the lever along at least most of the lever's length. The driver is thereby, upon exiting the vehicle, provided with a tactile and visual reminder of the vehicle's occupancy.

In a sub-aspect, the deploying can include releasably attaching the bottom end to the interior side at a third location which is vertically below the lever.

In a further sub-aspect, the flap to be deployed includes first, second, and third attachment devices for respective attachment to the first, second and third locations. The flap may be configured as to dimension, placement of the first and third attachment devices, flexibility of the flap between first and third attachment devices, and case with which the third attachment device is separable from the third location in comparison to case with which the first attachment device is separable if at all from the first location, so as to cause the following. The flap while attached to the interior side at the first and third locations interferes with, but does not prevent, manual access by the driver for the operating of the lever. Prevention is avoided by virtue of laxness in the flap providing a flap-to-interior-side gap into which a driver-side hand of a driver can, by motion along the interior side, at least partially enter as the hand approaches the lever. The attachment at the third location can be at least partially undone by wedging force of the hand moving toward the lever for the operating of the lever. The hand has a breadth in the range 2.6 to 4.0 inches across an area where the fingers of the driver-side hand join the palm of that hand.

In another aspect, a hanging flexible flap is designed for a vehicle having a driver-side door designed to be opened by the driver. The door has an interior side and, manually accessible on the interior side, a door handle. The door handle includes a lever operable for opening the door for exiting the vehicle. The flap has a top end and a bottom end. The flap includes: a first attachment device disposed at the top end; a second attachment device disposed at the bottom end; and, in contact with the first and second attachment devices, a flexible body. Each of the first and second attachment devices is configured for attaching the flap to the interior side. The flap is dimensioned, configured as to placement of the first and second attachment devices, and sufficiently flexible between the first and second attachment devices: both to, with the attachment of the flap by said first attachment device to said interior side being at a first location on said interior side which is vertically above the lever, be folded up, and hang down to cover the lever along at least most of the lever's length; and that folding up, by the bottom end, the flap covering the lever to uncover the lever and then releasably attaching the second attachment device to a second location on the interior side which is vertically above the first location folds the flap up sufficiently such that the lever is not covered by the flap along at least most of the lever's length.

In a sub-aspect, the flap may further include, at the bottom end, a third attachment device configured to releasably attach to the door at a third location on the interior side which is vertically below the lever.

In a further-dependent sub-aspect, the first and third attachment devices can be configured such that the attachment by the interior side to the third attachment device at the third location is weaker than the attachment by the interior side to the first attachment device at the first location. What the first, second, and third attachment devices attach to at their respective times of attachment is considered to be the interior side (of the driver-side door designed to be opened by the driver). The interior side thus includes any mounting pre-existing at that time to respectively the first, second, or third location. An example at the first location would be a metal strip that has been mounted to the door panel and which is designed for magnetic attachment to the flap.

In a different sub-aspect, the flap has, as two oppositely-facing sides: a first attaching side that, with the first attachment device attached to the interior side at the first location, faces at the top end the interior side; and a second attaching side which at the bottom end is made to face the interior side when, with the attachment of the first attachment device to the interior side at the first location being retained, the second attachment device is, with the flap being folded up sufficiently to allow the attachment at the second location, attached to the interior side at the second location.

In a still further sub-aspect, the flap can further include, on the second attaching side, a container and a lid mutually releasably attachable and configured for sealingly enclosing scented material. The container and the lid may be positioned so that they are: a) releasably co-joinable upon the sufficient folding up; and b) mutually releasable in the covering of the lever along at least most of the lever's length.

In an alternative or supplemental sub-aspect, the flap can have a zippered pocket on the second attaching side.

As yet another alternative or supplemental sub-aspect, the first attaching side of the flap may include a fluorescent substance, a phosphorescent substance, or both a fluorescent substance and a phosphorescent substance.

In another aspect, a driver-side door of a vehicle is designed to be opened by the driver. The door has an interior side having an outer surface. The door comprises a vehicle door frame and, assembled on the vehicle door frame, a vehicle door panel on the interior side. The door handle is manually accessible on the interior side to the driver and operatively connected to the vehicle door frame for opening the door. The door handle includes a lever operable by the driver for opening the door to exit the vehicle. The door further includes, as part of the interior side, at a location vertically above the lever, a first horizontal strip of material. It also includes, as part of the interior side, vertically above the first horizontal strip of material, a second horizontal strip of material. It further includes, as part of the interior side, vertically below the lever, third-location material having two opposite sides, one of two opposite sides facing away from the driver. The other of the two opposite sides is a flat surface facing the driver and oriented substantially parallel to or substantially flush with a surrounding portion of the outer surface of the interior side. At least part of the third-location material is either magnetic or attractable by magnetism. For any of the first and second horizontal strips and the third-location material, one of two opposite sides may be facing away from the driver, the other of the two opposite sides being a flat surface facing the driver and oriented substantially parallel to or substantially flush with a surrounding portion of the outer surface of the interior side. An intervening gap between the first and second horizontal strips of material is a first separating distance that is no more than 4 inches.

In a sub-aspect of this, a reminder-equipped door includes the aforementioned door and further includes a hanging flexible flap non-resilient to bending. The flap has a top end and a bottom end, and is attached, at the top end, to the first horizontal strip of material. The hanging flexible flap is, at the bottom end with the attachment at the top end being retained, attachable alternately: to assume a pre-deployment state, to the second horizontal strip of material; and, in being deployed as a reminder to the driver upon the driver exiting the vehicle, to the third-location material.

In an alternative or supplementary sub-aspect, at least part of the first horizontal strip of material is either magnetic or attractable by magnetism, and at least part of the second horizontal strip of material is either magnetic or attractable by magnetism.

In another alternative or supplementary sub-aspect, the first horizontal strip of material, the second horizontal strip of material, and the third-location material are located such that, between any two of the three, any intervening gap is a second separating-distance that is no more than 8 inches.

A vehicle having the driver-side door, in any of the above variations, is likewise proposed herein.

In an associated aspect, the flexibility of the flap can be such that the folding up creates, in the flap, a fold line and lifts the fold line in the flap vertically upward. The term "fold line" does not imply that the flap has a V-shaped crease defining the fold line. Instead, the fold line is, more generally, the line formed by the vertically lowest points of the flap. Typically, the cross-section near the bottom of fold of the folded flap would be U-shaped. For a U-shaped cross-section, the vertically lowest points of the U-shaped cross-sectional slices collectively form the fold line. The joint height which is an average height of the first and second locations is, when respective flap attachments exist thereto, high enough that the fold line is sufficiently high that the flap does not cover the lever along at least most of the lever's length. The flap can include material that, at the fold line, is flexible and non-resilient to bending. The fold line moves vertically upward when the flap is folded up—relatedly, at least a region of the flap having vertical extent may be supple and non-resilient to bending. Conversely, the fold line moves vertically downward while the flap is unfolded or allowed by gravity to unfold.

In another version of a reminder-equipped door, a driver-side door is designed to be opened by the driver, the door having: an interior side that faces inwardly the driver; an exterior side; and a flap passageway disposed between both sides. The door includes: a vehicle door frame; a vehicle door panel on the interior side and assembled on the vehicle door frame; and, operatively connected to the vehicle door frame, a door handle manually accessible on the interior side to the driver for opening the door. The door handle includes a lever that has a horizontal extent and that is operable by the driver for opening the door to exit the vehicle. The lever has both a pivot point at a fulcrum, and an effort endpoint. The flap passageway has, vertically above the lever, an opening into a passenger compartment of the vehicle. The interior side has a flap-retaining site disposed vertically below the lever. The door further includes a hanging flexible flap for hanging down over the lever to, horizontally, at least partially cover, and thereby impede the driver's manual access to, the lever—this serves as a reminder to the driver upon the driver exiting the vehicle. The flap has an internal end and an external end and, between the internal and external ends, a flexible portion. The flap is, at the internal end, fixed to an anchor that keeps the flap at least partially within the flap passageway. The flap has, at the external end, a retaining device for releasably engaging the flap at the flap-retaining site. The flap is horizontally dimensioned to, when releasably engaged by the retaining device, cover at least most of the horizontal extent of the lever but not to, in total taking into account both sides, overextend the lever horizontally by more than 50 percent. The horizontal extent is equal to the horizontal distance between the pivot point and the effort endpoint. The vehicle having the driver-side door is likewise proposed herein.

In an aspect of this version, the flap is retractable into the flap passageway for storage and is, for vertical extension, drawable from the flap passageway for the covering of the lever.

In a further aspect, the anchor includes a revolvable spindle around which the flap winds during the retraction and from which the flap unwinds during the vertical extension.

In a different aspect, the horizontal overextension if any is, in total taking into account both sides, no more than 25 percent.

In yet another aspect, the horizontal overextension if any is, in total taking into account both sides, no more than 10 percent.

A vehicle having this version of the driver-side door, in any of the above variations, is likewise proposed herein.

Various ones of the aspects are contemplated as combinable at least as per the claims herein below.

Details of the novel vehicle occupancy reminder method and apparatus are set forth further below, with the aid of drawings, which are not drawn to scale.

DETAILED DESCRIPTION

Figure 1A:
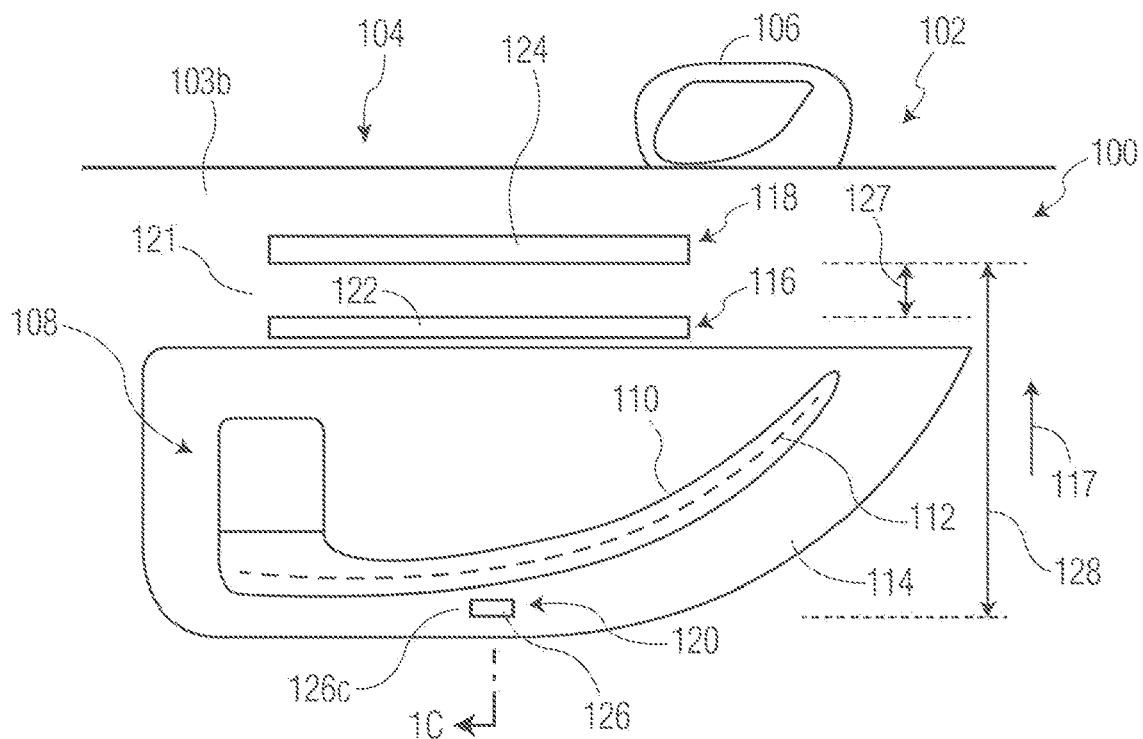
FIG. 1A is a schematic view at a small perspective angle of exemplary mountings attachable to a hanging flexible flap in accordance with aspects of what is proposed herein.
Figure 1B:
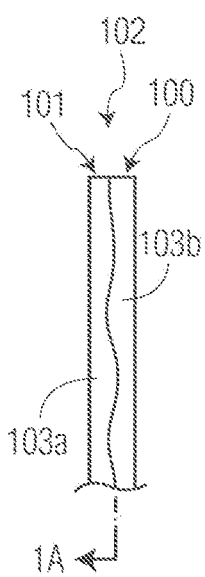
FIG. 1B is a conceptual depiction of a vehicle door frame and a vehicle door panel assembled on the vehicle door frame.

FIG. 1A shows, by way of illustrative and non-limitative example, an aspect of what is proposed herein, in the context of the interior side 100, as opposed to the exterior side 101, of a driver-side front door 102 of a vehicle, for example a car or other motor vehicle for carrying at least one passenger, such as a truck. As seen from FIGS. 1A and 1B, the door 102 has a frame 103*a* and, assembled over the frame 103*a*, a panel 103*b*, covering or "skin", as conceptually depicted in FIG. 1A. The panel 103*b* includes parts, such as plastic door moldings, on the interior side 100 of the door 102. Although not shown in the conceptual depiction of FIG. 1B, structures such as a retracted door window exist in gaps between the frame 103*a* and the panel 103*b*. An interior door handle for exiting the vehicle 104 is mechanically attached to the door frame 103*a* although manually accessible to the driver from inside the vehicle 104. More generally, the driver-side door 102 has an interior side 100 and, on the interior side 100, a door handle manually accessible to the driver from inside the vehicle 104. The door 102 is designed to be opened by the driver. In this case, the driver side is on the left for someone facing forward, although the description herein applies analogously to vehicles 104 having the steering wheel on the right. A driver-side side mirror 106 is mounted externally. Everything else depicted in FIG. 1A is interior. An interior door handle 108 manually accessible on the interior side 100 to the driver includes a lever 110 having a length 112 which is represented in FIG. 1A by the length along the broken line indicated by the lead line from reference number 112. In this example, the lever 110 pulls inwardly into the vehicle 104 to open the door 102. The interior door handle 108 is disposed within a recessed compartment 114 of the interior side 100. A first location 116 on the interior side 100 vertically above 117 the lever 110, and a second location 118 on the interior side 100 vertically above 117 the first location 116, serve as points of attachment to a hanging flexible flap. Here, the word "point" is used loosely in the sense of an area, region, or site.

From a first point of attachment on the interior side 100 of the driver-side door 102, the flap can hang down to cover, and thereby momentarily interfere with, the driver's exit from the vehicle 104. Thus, the flap is deployed as a reminder, to the driver of infants, toddlers, or elderly in the back seat(s) or otherwise, of the vehicle's occupancy. When the reminder is not needed, as when there are no child or elderly passengers, the flap can be conveniently stowed away somewhat but not to the point where it is out of sight and easily forgotten when next it needs to be used as a reminder. In particular, a simple hand movement folds the flap from the bottom up so that, while retaining the first point of attachment, the flap is now also attached at a second point of attachment to the interior side 100, this second point residing vertically above 117 the first point of attachment. In this folded-up configuration, free access by the driver to the lever 110 is available. To put the reminder again into effect, the flap can easily be unfolded by manually undoing the second connection with a simple tug and immediately restoring the deployment. The deployment can include "buttoning down" the flap at a third point of attachment to the interior side 100, this third point residing not only below the above-mentioned points of attachment, but below the lever 110. The flap, as a consequence, cannot now wander to and fro, brushing against the driver's arm during the trip, for instance when the vehicle 104 is turning.

As just mentioned, a third point of attachment to the hanging flexible flap may exist at a third location 120 on the interior side 100 vertically below the lever 110. Although the third location 120 is shown to be within the recessed compartment 114, the location 120 may be located vertically below the recessed compartment 114. Optionally, the recessed compartment 114 may not be a feature of the vehicle 104 having the third point of attachment. Likewise, the placements in FIG. 1A of the first and second locations 116, 118, relative to the recessed compartment 114 which may or may not exist, are merely examples. Also, different portions 121 of the interior side 100 may be differently shaped, for instance as level, concave, or convex outer surfaces, and/or differently oriented such as vertically, horizontally, or in between vertically and horizontally.

The hanging flexible flap is, as described herein above, designed to be attached to the interior side 100, at any given time, at one or two from among the first, second, and third locations 116, 118, 120 on the interior side 100. For example, the hanging flexible flap could be a generally rectangular piece of material, one side of the rectangle being at the "top end", with the "bottom end" being located at the opposite side of the rectangle. The hanging flexible flap may include first, second, and third attachment devices each of which is located at its respective "end", i.e., either the top end or the bottom end. The first attachment device when attached to the interior side 100 can be attached to the first location 116, the second attachment device when attached to the interior side 100 can be attached to the second location 118, and the third attachment device when attached to the interior side 100 can be attached to the third location 120. Hereinafter, the attachments (i.e., of the first, second, and third attachment devices respectively) at respectively the first through third locations 116, 118, 120 will be referred to at times as correspondingly the "first attachment", "second attachment", and "third attachment." Also, what the first, second, and third attachment devices attach to at their respective times of attachment is considered to be the interior side 100. The latter thus includes any mounting pre-existing at that time at respectively the first, second, or third location 116, 118, 120. An example of such a mounting is a horizontal strip which is discussed further herein below in connection with reference numerals 122, 124, 126.

The methods of attachment of the hanging flexible flap at each of the first, second, and third locations 116, 118, 120 in the instant embodiment rely on magnetism, although alternative methods of attachment will be discussed further herein below.

Figure 1C:
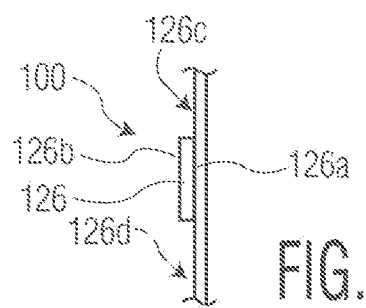
FIG. 1C is an enlarged side view of third-location material and a surrounding portion of the interior side of a vehicle in accordance with aspects of what is proposed herein.
Figure 2:
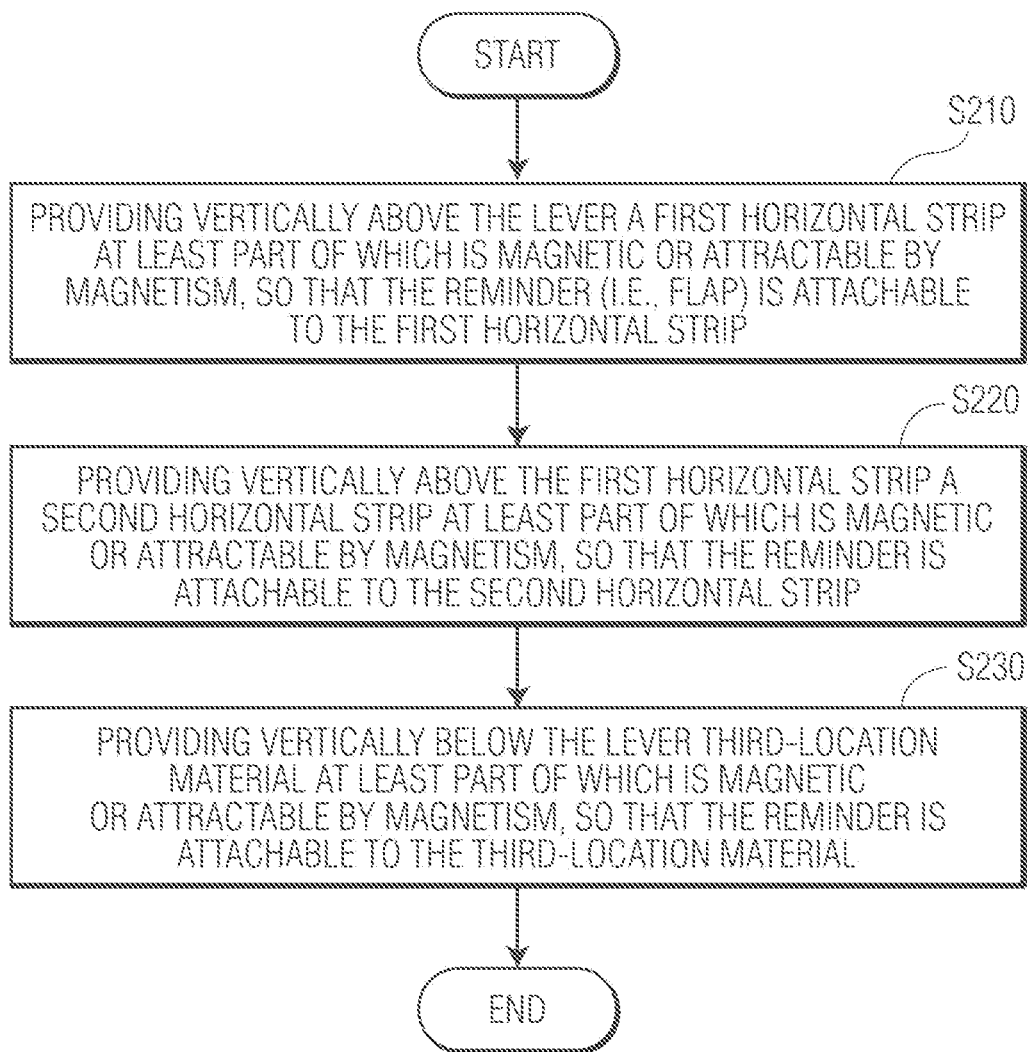
FIG. 2 is a flow chart of an exemplary method of preparing a vehicle for attachment of a magnetic-attachment embodiment of the hanging flexible flap in accordance with aspects of what is proposed herein.

First, the interior side 100 may be prepared so that the attachments to the flap can be made. Referring now to FIGS. 1A, 1C, and 2, mounted to the first location 116 is a first horizontal strip 122 of material. For the embodiment shown in FIG. 1A, at least part of the first horizontal strip 122 is, as in the case of ferromagnetic matter for example, either magnetic or attractable by magnetism. The strip 122 can be cut from a roll of magnetic tape or can be more rigid as in a strip of metal plate. If the strip 122 does not have an adhesive backing, it can be provided with one appropriate to the material composition of the interior side 100 where the strip 122 is mounted. By virtue of the strip 122 being mounted to the interior side 100 at one of the three locations 116, 118, 120, the strip 122 is part of the interior side 100. Via a first attachment device, the flap is attachable to the interior side 100. That attachment of the flap is through the first horizontal strip 122 of material. A second horizontal strip 124 of material is mounted to the second location 118. As in the case of at least part of the first horizontal strip 122, at least part of the second horizontal strip 124 is either magnetic or attractable by magnetism. Via a second attachment device, the flap is attachable to the interior side 100 by means of the second horizontal strip 124 of material. Mounted to the third location 120 as part of the interior side 100, and disposed sideways and vertically below the lever 110, is third-location material 126 at least part of which is either magnetic or attractable by magnetism. Via a third attachment device, the flap is attachable to the interior side 100 by means of the third-location material 126. Typically, the flap would be attached to the interior side 100 via both the first and third attachment devices (in a deployed state), or via the first and second attachment devices (in a pre-deployment state), as will be discussed in detail further herein below. The flap would, for example, be manually manipulated to alternate between the two states according to the current reminding needs, or current lack thereof, of the driver.

For any of the first and second horizontal strips 122, 124 and the third-location material 126, it can be positioned, at least as the driver views it, flat against the immediately surrounding area of interior side 100. Thus, for any of the first and second horizontal strips 122, 124 and the third-location material 126, and with reference to FIG. 1C, one 126a of two opposite sides may be facing away from the driver, the other of the two opposite sides being a flat surface 126b facing the driver and oriented like a surrounding portion 126c of the outer surface 126d of the interior side 100. For example, the driver-facing flat surface 126b could be oriented substantially parallel to or substantially flush with the surrounding portion 126c of the interior side 100. The surrounding portion 126c may be area of the outer surface 126d that immediately adjoins the first horizontal strip 122, the second horizontal strip 124, or the third-location material 126, as the case may be. The immediately-adjoining surrounding portion 126c may be curved slightly (with a radius of curvature of 8 or more inches) as seen in FIG. 1C. This slight curvature may exist if, for instance, the third location 120 is located within a slightly-curved recessed compartment 114 of the interior side 100. It could be said in such a case that parallelism between a slightly curved surface and a flat one "substantially" exists. Likewise, two flat surfaces could be substantially parallel. In the FIG. 1C embodiment shown in particular, the driver-facing flat surface 126b is oriented substantially parallel to the surrounding portion 126c. Although, the third-location material 126 could instead be embedded so that the driver-facing flat surface 126b is substantially flush with, rather than substantially parallel to, the surrounding portion 126c.

As seen in FIG. 1A, the third-location material 126 may, in comparison with the first and second horizontal strips 122, 124, have much shorter horizontal span. The overall (horizontal and vertical) span of the third-location material 126 can be much less than that of either of the first and second horizontal strips 122, 124, thereby affording a weaker attachment at the third location 120 than at either the first or second locations 116, 118. This is because the third attachment is not relied upon to support the weight of the flap. Because the third attachment is weaker, its undoing requires less force. This facilitates the driver's emergency exit from the vehicle 104. It also facilitates transition from the deployed state to the pre-deployment state. As noted further herein below, the short vertical span of the second attachment (at the second horizontal strip 124) facilitates the opposite transition—from the pre-deployment state to the deployment state. The first and second horizontal strips 122, 124 may for example each be 7 by 7/10 inches and 1/10 of an inch thick, with the third-location material 126 being 7/10 by 7/10 inches and 1/10 of an inch thick.

It is preferable that the magnetic attraction between the first horizontal strip 122 of material and the first attachment device of the flap be strong, because, as discussed further herein below, the attachment at the first location 116 normally would not be undone frequently if at all. This attachment can be of a more permanent nature, using permanent glue for example. Also, even if the first attachment device is separable from the first location 116, the attachment may be designed to be stronger than at the other locations 118, 120, via the use of industrial-strength rather than regular-strength hook and loop fasteners, for example. It is preferable that the first horizontal strip 122 be securely mounted onto the interior side 100 if not integral with it.

Although the first attachment, which is an attachment of the first attachment device to the interior side 100 at the first location 116, typically is rarely if ever undone, the attachment at the second location 118 might be undone each time the hanging flexible flap is deployed (i.e., is manipulated to sufficiently cover the lever 110 to thereby serve as a reminder to the driver upon his/her exiting the vehicle 104). It is therefore practical that the magnetic attraction at the second attachment can be weaker than at the first attachment, provided this second attachment holds throughout the time the hanging flexible flap is in a pre-deployment state. Thus, a magnet causing the second attachment can be thinner than a magnet causing the first attachment.

The third attachment is undone frequently, as in the case of the second attachment. It is therefore practical that the magnetic attraction making the third attachment can be weaker than for the first attachment, provided this third attachment holds throughout the time the hanging flexible flap remains deployed.

The type of adhesive to use for adhesion of the interior side 100 to each of the strips 122, 124 and the third-location material 126 can be tailored to the relative strength of the magnetic pull in releasing the respective attachment.

As an alternative to adhesive, the corresponding surfaces on the interior side 100 may already be magnetic or attractable by magnetism without any mounting having occurred. For example, the interior side 100 adjacent to the first, second and/or third location 116, 118, 120 may have an outer surface, i.e., the surrounding portion 126c, that includes hard plastic or another polymer. In that case, any of the first and second horizontal strips 122, 124 and the third-location material 126 may emerge from the outer surface as a surface portion, or "strip", substantially flush with the outer surface.

Also, as an alternative to using magnetism as a basis for the first, second, and third attachments, other forms of attachment, such as friction-based ones, can instead be employed. Attachment can be, for instance, by snaps, or by VELCRO®-brand hook and loop fasteners. VELCRO® is a registered trademark of Velcro BVBA. For this latter attachment mechanism, an array of hooks may be mounted to one thin polymer surface with the hooks extending outward from the surface. A matching array of loops may be mounted to a second such surface with the loops extending outward from the second such surface. By bringing together the hooks and loops, the two surfaces can be joined, and are separable by manually peeling away the hooks from the loops or vice versa. The attachment methods need not all be uniform. Thus, the first attachment could be magnetic or by strong or permanent or semi-permanent adhesive, with the second and third attachments by hook and loop fasteners.

In case of hook and loop fastening in making any of first, second, and third attachments, the hook array or the matching loop array could, by its adhesive backing if configured with such, be mounted to the second location 118 thus making the mounted array part of the interior side 100. The other of the hook array and loop array can by its adhesive backing or by sewing around the array's perimeter be mounted to the hanging flexible flap.

More generally, the interior side 100 is attachable, by any known and suitable methods of attachment, at each of the three locations 116, 118, 120 to the corresponding first and second horizontal strips 122, 124 and the third-location material 126, these latter structures being implemented with, for example, magnetic or magnetically attractable material or with hook-and-loop fastening.

Likewise, these latter structures are respectively attachable to the first, second, and third attachment devices by any known and suitable methods of attachment.

Although a car is mentioned above as an example of a vehicle 104, the intended scope of the invention is not limited to a car. The vehicle 104 may be, for instance, a truck, or a boat or airplane having a cabin with a lever-opened door. The vehicle 104 may be, for example, a motor vehicle or a vehicle pulled by gravity along a smooth, icy, down-sloping surface.

Also, the vehicle 104 need not have more than two side doors, nor even multiple doors. The vehicle 104 could, for instance, be a two-door coupe. The coupe could have passenger seats in a row behind the driver. Moreover, the passenger to the side of the driver in a two-seat car may be an elderly person, or it may be a baby whether it should be in the front row or not. The passenger would or could be the beneficiary of a reminder. The vehicle 104 could have more than two rows of seats.

A hanging flexible flap for any of the above-described vehicles 104 comes within the intended scope of the present invention.

FIG. 2 presents a particular method of preparing a vehicle 104 for utilizing the flap configured for attachment by magnetic attraction. The method includes providing on the interior side 100 at the first location 116 vertically above 117 the lever 110 a first horizontal strip 122 of material, at least part of the first horizontal strip 122 being either magnetic or attractable by magnetism (step S210). Upon attachment of the first horizontal strip 122, the interior side 100 includes the first horizontal strip 122. More specifically, an outer surface of the first horizontal strip 122, that outer surface facing the driver, is, at the site of the first horizontal strip 122, due to its mounting at that site (i.e., the first location 116) an outer surface of the interior side 100. The area of the first horizontal strip 122 (projected to the viewer in FIG. 1A) matches that of the first location 116. Via the mounted first horizontal strip 122, the flap is attachable to the interior side 100, so that the reminder (i.e., flap) is attachable to the first horizontal strip 122. The method further includes providing, on the interior side 100 vertically above 117 the first horizontal strip 122 a second horizontal strip 124 of material, at least part of the second horizontal strip 124 being either magnetic or attractable by magnetism (step S220). Likewise, the second horizontal strip 124 is, as a consequence of its attachment at the second location 118, part of the interior side 100. Likewise, the area of the second horizontal strip 124 matches that of the second location 118, and, via the mounted second horizontal strip 124, the flap is attachable to the interior side 100 so that the reminder (i.e., flap) is attachable to the second horizontal strip 124. A further step is providing, on the interior side 100 vertically below the lever 110, third-location material 126. At least part of the third-location material 126 is either magnetic or attractable by magnetism, for magnetic attraction to the material residing at the bottom end of the flap (step S230). Likewise, the third-location material 126 is, as a consequence of its attachment at the third location 120, part of the interior side 100. Also, the area of the third-location material 126 matches that of the third location 120. Via the mounted third-location material 126, the flap is attachable to the interior side 100 so that the reminder (i.e., flap) is attachable to the third-location material 126. The first and second horizontal strips 122, 124 and the third-location material 126 are accordingly in the present embodiment located respectively at the first, second, and third locations 116, 118, 120. In the present embodiment, an intervening gap, i.e., the shortest connecting straight line, between the first and second horizontal strips 122, 124 of material is a first separating-distance 127 that is no more than 4 inches. In the present embodiment, the first horizontal strip 122 of material, the second horizontal strip 124 of material, and the third-location material 126 are located such that any intervening gap between any two of the three is a second separating-distance 128 that is no more than 8 inches. In other embodiments, the limits of 4 and 8 inches may be different, 5 and 9 inches for example. The second separating-distance 128 is likewise the shortest connecting straight-line.

Figure 3A:
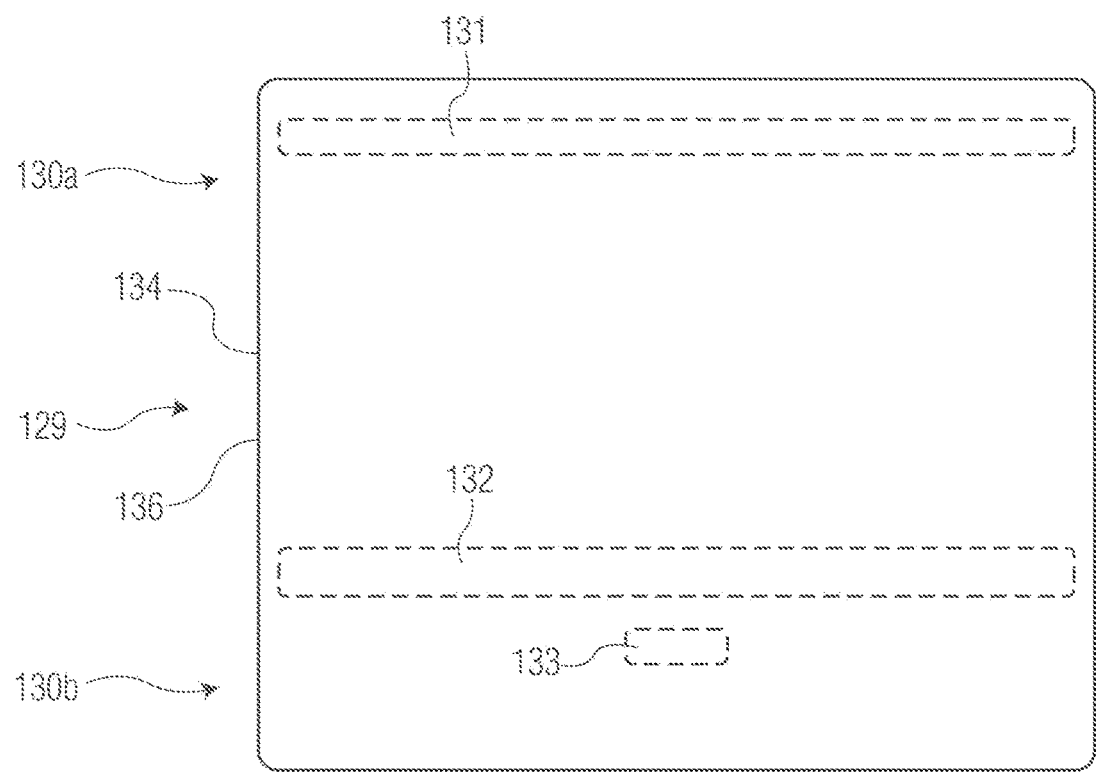
FIG. 3A is a front view of an exemplary hanging flexible flap attachable to a vehicle interior by magnetism in accordance with aspects of what is proposed herein.
Figure 3B:
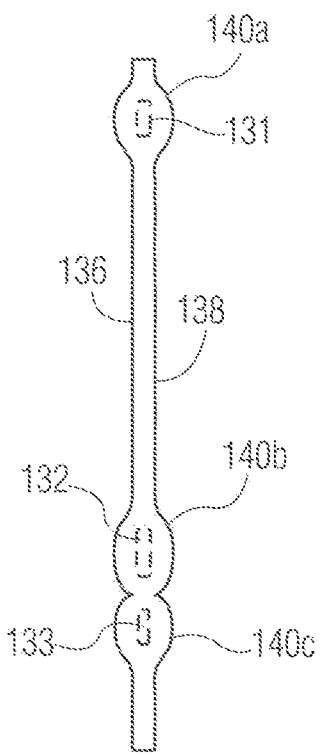
FIG. 3B is an enlarged side-view of the hanging flexible flap of FIG. 3A.

FIG. 3A shows an exemplary hanging flexible flap 129 having a top end 130a, a bottom end 130b and, in contact with both the first and second attachment devices 131, 132 that are disposed respectively at the two ends 130a, 130b, a flexible body 134. This version of the flap 129 is composed of two layers 136, 138 as seen in FIG. 3B, the side view. The two layers 136, 138 are joined to form three pockets 140a, 140b, 140c. The first pocket 140a houses a first attachment device 131. The second pocket 140b houses a second attachment device 132. The third pocket 140c houses a third attachment device 133. The third attachment device 133 may have a flat surface to magnetically mate with the driver-facing flat surface 126b of the third-location material 126 on the interior side 100 of the driver-side front door 102 (shown in FIGS. 1A and 1C). The attachment devices 131-133 are represented in FIGS. 3A and 3B by broken lines since they are within and thus hidden by their respective pockets 140a-c from that view. Here and going forward in the specification, when hidden lines are hidden by the flap 129, it is assumed that the flap 129 is not transparent, although it is not required that the flap 129 be non-transparent. Although the two layers 136, 138 are, for purposes of illustration, depicted in FIG. 3B as apart, they are closely adjacent, except where the pockets 140a-c are formed.

In this version of the flap 129, as seen in FIGS. 3A and 3B, for each of the attachment devices 131-133, at least part of the device is magnetic or attractable by magnetism. If a particular attachment device 131-133 is magnetic, the structure on the interior side 100 that the device 131-133 attaches to is attractable by magnetism, and vice versa. Thus, for example, the first attachment device 131 is attachable to the first horizontal strip 122 of material, because one of device 131 and strip 122 is magnetic and the other is attractable by magnetism.

The layers 136, 138 of the flap 129 may each be made individually or collectively of cloth, fabric, or a textile. Some examples would be polyester fabric such as Ottertex® acrylic waterproof canvas fabric; a blend of 90% cotton and 10% spandex such as embossed scuba pin fabric manufactured by Fabric Wholesale Direct; and a blend of 75% polyester, 17% nylon, and 8% spandex such as cabaret stretch mesh manufactured by Fabric Wholesale Direct. Although flexible, the material providing the flap 129 with its flexibility for the covering and uncovering of the lever 110, and for making the second and third attachments, may be non-resilient between the first and second attachment devices 131, 132 and between the first and third attachment devices 131, 133. Yet, the material could in some ways be resilient—it may, for example, be supple and not resilient to being bent, e.g., folded, yet be resilient to some stretching. A rubber band, for example, is, as long as its elastic limit is not exceeded, resilient to stretching. Although it is not necessarily resilient to bending. Resilience is defined herein as the ability of a material to absorb energy when it is deformed elastically and release that energy upon unloading. Elastic deformation is defined herein as a reversible deformation in which the elastic force is equated to the external force that causes deformation. The layers 136, 138 are each thin enough, for example between 0.5 and 1.5 millimeters, so that magnetic attraction to the first and second horizontal strips 122, 124 and to the third-location material 126 is effective in holding the flap 129 to the interior side 100. Also, the feel of flap 129, particularly if the flap 129 contains natural material, is different from the feel of the hard plastic or metal lever 110, which enhances the tactile reminder. The suppleness of the material, which includes its non-resilience to bending, also has a different feel and thus enhances the tactile aspect of the reminder.

The attachment devices 131-133 need not uniformly be magnets nor be uniformly attractable by magnetism; instead, the attachment devices 131-133 can differ from each other in this respect. Thus, one attachment device could be magnetic while another attachment device is not magnetic but attractable by magnetism. Nor do the attachment devices 131-133 have to be uniformly of the same kind functionally, e.g., one or more could be based on magnetism and remaining ones could be implemented as hook and loop fasteners. Thus, by way of example, the flap 129 is made up of layers 136, 138, and at least one of the first and second attachment devices 131, 132 is enclosed between the layers 136, 138. Thus, both the first and second attachment devices 131, 132 are enclosed between the layers 136, 138, or one of the two attachment devices 131, 132 is between the layers 136, 138. In the latter case, the other one of the two attachment devices 131, 132 could be attached to the outside of the flap. Specifically, it could be attached onto a particular one of the two oppositely-facing (i.e., "flip") sides of the flap 129. The term "flip side" does not herein connote that either side of the two oppositely-facing sides is more important than the other.

Figure 4A:
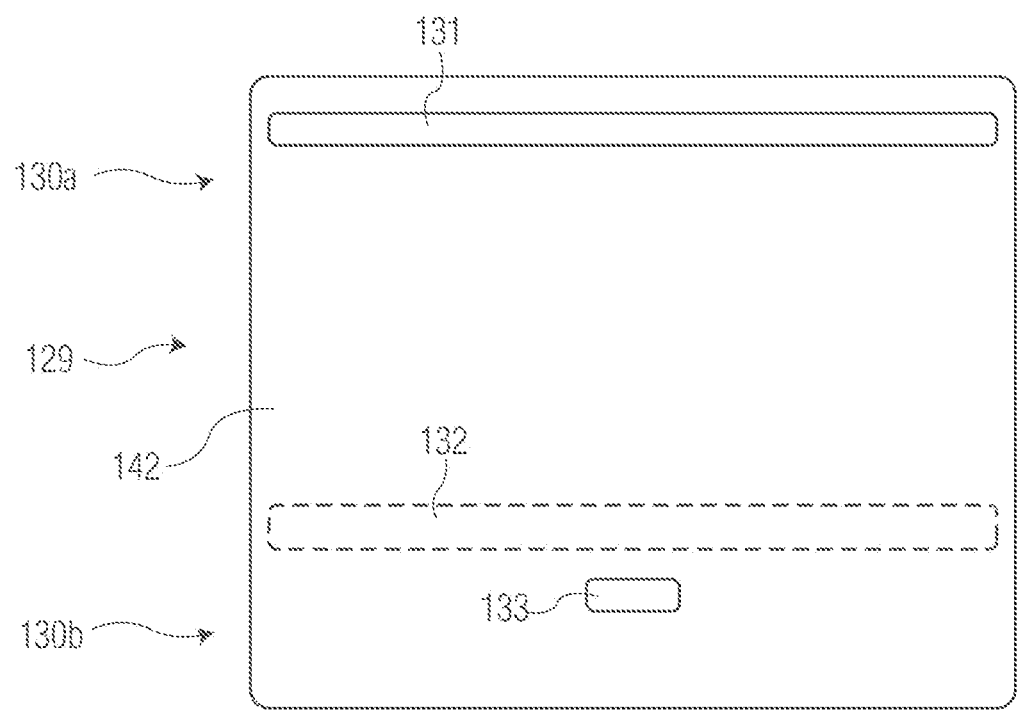
FIG. 4A is a schematic drawing of the first attaching side of an exemplary hanging flexible flap, the flap being attachable to a vehicle interior by a hook and loop fastener in accordance with aspects of what is proposed herein.
Figure 4B:
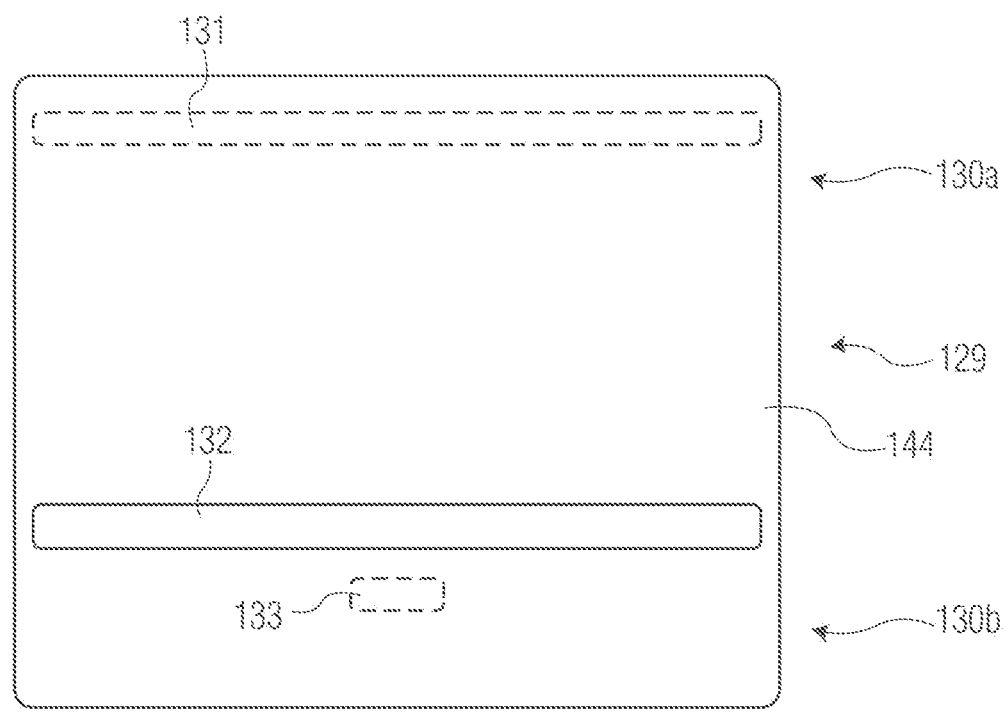
FIG. 4B is a schematic drawing of the second attaching side of an exemplary hanging flexible flap, the flap attachable to a vehicle interior by a hook and loop fastener in accordance with aspects of what is proposed herein.
Figure 5:
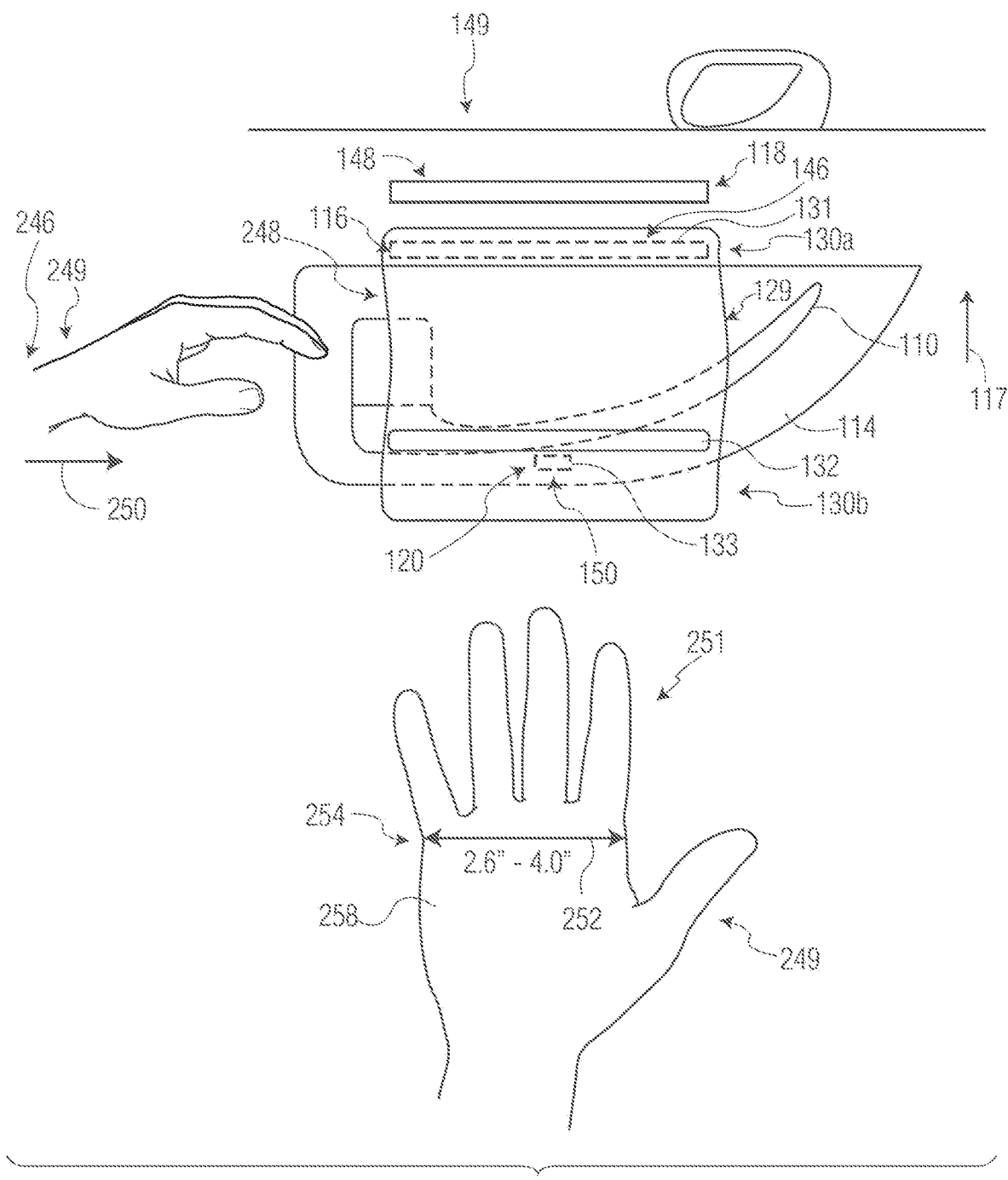
FIG. 5 is the image of FIG. 1A at a small perspective angle, including, in addition, an exemplary deployed hanging flexible flap attachable by hook and loop fastener, further including the hand of the exiting driver, that hand reaching in a motion that will undo the deployment, in accordance with aspects of what is proposed herein.

For simplicity of illustration on how the flap 129 is used and without loss of generality, for the example embodiments in FIGS. 4A, 4B, and 5, the first, second, and third attachments are by hook and loop fastener rather than by magnetic material. Instead of a double-layered flap 129, a hook array or a matching loop array could be attached onto a single-layer flap 129, the single-layer thickness being for example between 0.5 and 1.5 millimeters. Thus, in FIGS. 4A, 4B, and 5, the hook array or loop array may be visible depending on which of the two oppositely-facing sides of the flap 129 is shown, and that visible structure will be outlined in FIGS. 4A, 4B, and 5 by a solid, rather than broken, line.

FIG. 4A shows a first attaching side 142 of the flap 129 that has two oppositely-facing (i.e., "flip") sides. The first attaching side 142 faces at the top end 130a the interior side 100 (seen in FIG. 1A) when the first attachment device 131 is attached to the first location 116. When the flap 129 is in a deployed state (i.e., deployed as a reminder as in FIG. 5), and thus the first attachment device 131 is attached to the first location 116, the first attaching side 142 faces at the bottom end 130b (and in all area between the bottom and top ends 130a, 130b) the interior side 100. The first and third attachment devices 131, 133 are mounted on the first attaching side 142 in the embodiment shown in FIG. 4A.

Figure 6:
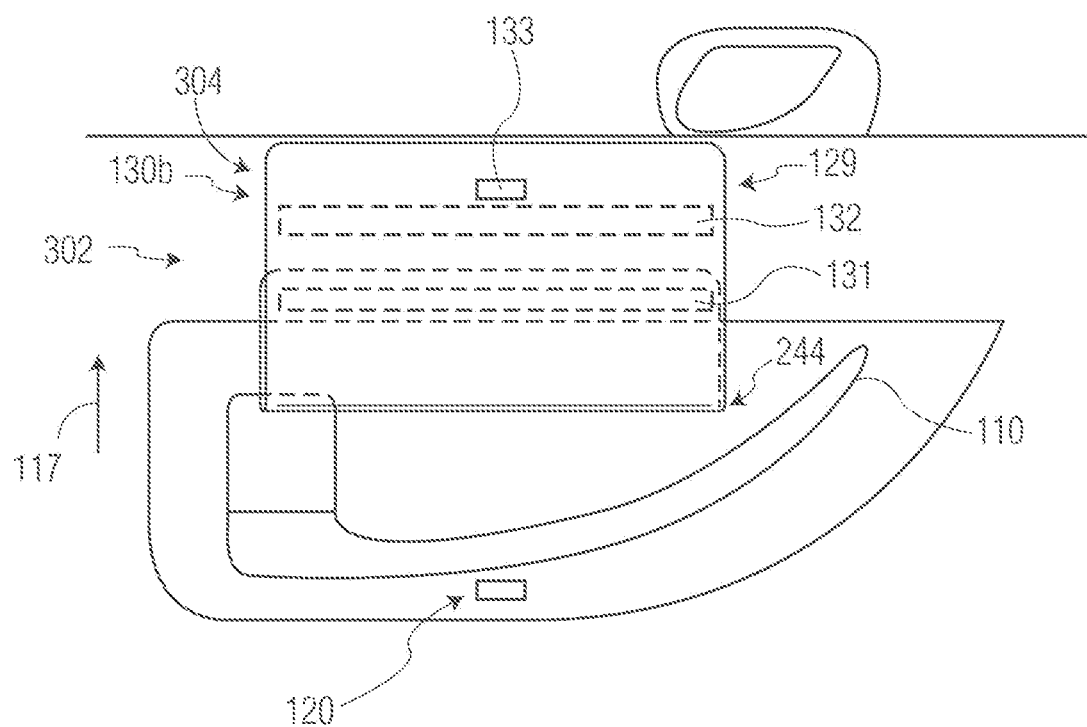
FIG. 6 is a schematic view at a small perspective angle of the hanging flexible flap of FIG. 5 in a pre-deployment state in accordance with aspects of what is proposed herein.

FIG. 4B shows the second attaching (i.e., flip) side 144 of the flap 129. To prepare the flap 129 for use in reminding (and to stow it away in-place until it is needed as a reminder), the flap 129 is put into a pre-deployment state 302 (as seen in FIG. 6). In particular, while the first attachment is retained, the flap 129 is folded up from the bottom end 130b of the flap 129 and then attached, by the bottom end 130b, to the second location 118, the latter being shown in FIG. 1A. In the resulting pre-deployment state 302, the second attaching side 144 faces, at the bottom end 130b, the interior side 100. In particular then, the pre-deployment state 302 is achieved when the following happens. With the first attachment being retained, the second attachment device 132 is attached to the second location 118 (seen in FIG. 1A), the latter occurring with the flap 129 being folded up sufficiently (as seen in FIG. 6) to allow the attachment at the second location 118. The degree of flexibility of the flap 129 allows putting the flap 129 conveniently out of the way in the pre-deployment state 302, a state in which the flap 129 may remain until there exists an upcoming need for an exit reminder about vehicle occupancy. Yet, as will be discussed herein below in connection with FIG. 9, the flap 129 while in the pre-deployment state 302 serves as a visible reminder to deploy when the deployment will soon be needed.

FIG. 5 shows a reminder-equipped door 149 portraying the flap 129 within the environment of FIG. 1A. FIG. 5 shows a deployed state of the flap 129. If there were no third attachment device 133, flap 129 would be considered deployed when both the first attachment exists and the flap 129 is sufficiently lowered. Ordinarily, the flap 129 is in the pre-deployment state 302 immediately before being deployed. In particular, and with reference to FIG. 6, in the pre-deployment state 302 the flap 129 is in a folded-up configuration 304, i.e., attached to the first location 116 (shown in FIG. 1A), but folded up to make the second attachment, i.e., perform the attaching of the second attachment device 132 to the interior side 100 at the second location 118.

For the pre-deployment state 302 of FIG. 6, and with reference again to FIG. 5, both the first and second locations 116, 118 are vertically above 117 the lever 110 and jointly high enough (i.e., at a sufficiently high average height) that the flap 129 does not cover the lever 110 along at least most of the lever's length 112, the latter being shown in FIG. 1A. Here, the term "jointly" is used, because vertically raising either the first location 116, the second location 118 or both locations 116, 118 vertically raises the fold line. In particular and for example, vertically raising just one of the two locations 116, 118 by a given amount, raises the fold line by half that amount. The "height" is the vertical distance of the center of area of the first or second location above a reference point common to both locations. The "average" is the sum of the two heights divided by two.

Conversely, in being deployed, the flap 129 is generally, first, detached from the second location 118 (unless, for example, perhaps if the flap 129 is being initially installed in the vehicle 104). After being detached from the second location 118, the flap 129 is then either manually unfolded, or permitted by force of gravity to be lowered out of a fold, to hang down so that the lever 110 is covered by the flap 129 at least along most of the lever's length 112, as seen from FIGS. 1A and 5. At this point, i.e., starting from this moment, the flap 129 would be deemed to be "deployed" if there is no third location 120. If there is a third location 120, as there is in FIG. 5, the flap 129 is considered deployed after the additional step of the third attachment being made. The best view of the shape of the flap 129 when deployed is provided in FIG. 10D. It is noted, however, that if there exists a third location 120 and a third attachment device 133 and if the third attachment is not made, this would not prevent the flap 129 from serving effectively as a reminder although the flap 129 is not regarded herein as "deployed."

Referring again to FIG. 6, an exemplary folded-up configuration 304 shields from the driver's view the first and second attachment devices 131, 132; whereas, by contrast, the third attachment device 133 is visible to the driver. The fold line 244 of the folded-up configuration 304 is noted in FIG. 6.

Upon deployment as shown in FIG. 5, the third attachment device 133 represented in FIG. 5 by a broken-line outline is no longer visible to the driver 246. Instead, it is attached directly (since it is hook array or loop array) to the other of the hook or loop array mounted to form part of the interior side 100 at the third location 120. Likewise, the first attachment device 131 remains non-visible to the driver 246, as seen in FIG. 5, and instead is joined to its counterpart hook array or loop array that is mounted to form part of the interior side 100 at the first location 116. What is visible to the driver 246, and thus demarcated by a solid line in FIG. 5, is the second attachment device 132, and likewise its counterpart hook or loop array mounted to form part of the interior side 100 at the second location 118.

As best seen from comparing FIG. 1A to FIG. 5, the first and second horizontal strips 122, 124 may horizontally span most of if not all of the width of the hanging flexible flap 129; whereas, vertically (i.e., from the top end 130a to the bottom end 130b as seen in FIG. 3A) their individual spans are much (e.g., more than 9 times) shorter. Due to the relatively short vertical span, deployment requires relatively little pulling force against the second attachment. Also, as to both the first and second attachments, the relatively short vertical span provides more flexibility in the design of the flap 129. This includes the overall proportioning of and attachment device placements for the flap 129 during its design phase, given that the available space on the interior side 100 located above the lever 110 varies with the particular vehicle's year, make and model.

The second attachment device 132 shown in the figures resides vertically between the first and third attachment devices 131, 133. A reason for this design is so that space available on the interior side 100 over the lever 110 for placing the second location 118 is sufficient. Such an ordering of attachment devices 131-133 may also create extra slack resulting in a wider flap-to-interior-side gap 248. Depending on the pre-existing or contemplated width of the gap 248, making it wider would potentially facilitate an emergency exit from the vehicle 104 by the driver 246 outlined in FIG. 12 and explained in detail further herein below.

Alternatively, if for instance adequate space over the lever 110 for placing the second location 118 exists and space below the lever 110 for placing the third location 120 is limited, the relative vertical positions of the second and third attachment devices 132, 133, could, from a design standpoint, be swapped as to their respective vertical positions on the flap 129. This would be done while keeping each attachment device 132, 133 on the same side of the flap 129, in the case of a VELCRO fastener implementation. The second and third locations 118, 120 may be vertically shifted correspondingly, regardless of type of implementation (e.g., VELCRO, magnetic).

Hereafter, the 131, 132, 133 ordering of attachment devices will be assumed.

The flap 129 is dimensioned, configured as to placement of the first and second attachment devices 131, 132, and sufficiently flexible between the first and second attachment devices 131, 132 to allow the following. With the flap 129 being attached by the first attachment device 131 to the interior side 100 at a first location 116 which is vertically above 117 the lever 110, the flap 129 can be folded up.

In addition, the flap 129 is dimensioned, configured as to placement of the first and second attachment devices 131, 132, and sufficiently flexible between the first and second attachment devices 131, 132 to allow the following. With the flap 129 attached by the first attachment device 131 to the interior side 100 at a first location 116 on the interior side 100 which is vertically above 117 the lever 110, the flap 129 can hang down to cover the lever 110 along at least most of the lever's length 112.

The flap 129 is also, with reference to FIG. 6, dimensioned, configured as to placement of the first and second attachment devices 131, 132, and sufficiently flexible between the first and second attachment devices 131, 132 so as to result in the following. Folding up, by the bottom end 130b, the flap 129 covering the lever 110 to uncover the lever 110 and then releasably attaching the bottom end 130b to the second location 118 folds the flap 129 up sufficiently such that the lever 110 is not covered along at least most of the lever's length 112. The folding up creates the fold line 244 and lifts it vertically upward. This lack of coverage of the lever 110 is as a result of the first and second locations 116, 118 being jointly high enough that the flap 129 does not cover the lever 110 along at least most of the lever's length 112. The joint height (or equivalently the "average height") is, with the second attachment device 132 attached to the second location 118, high enough that the fold line 244 is sufficiently high that the flap 129 does not cover the lever 110 along at least most of the lever's length 112. The flap 129 includes, in the current embodiment, material that, at least at the fold line 244, is flexible and non-resilient to bending. Because the fold line 244 is raised during the transition between deployment and pre-deployment, the transition causes the fold line 244 to shift on the flap 129 vertically upward. Conversely, the fold line 244 moves vertically downward while the flap 129 is unfolded or allowed by gravity to unfold. Non-resilience to bending is a property that may pertain to the flap 129, at least to a region thereof over which the fold line 244 shifts.

The flap 129 may be, for example, 6 inches by 7 inches. Or, more generally, it could be between 3 and 8 inches vertically and between 3 and 8 inches horizontally. Its dimensionality will, to meet the above configuration, within limits vary with the size and shape of features of the interior side 100 in proximity of the lever 110 for the particular vehicle 104. Although the flap 129 may be generally rectangular, its shape is not limited to that of a rectangle or in any way whatsoever.

The makeup of the flap 129 is such that the flap 129 includes, for example, cloth, fabric, or a textile that individually or collectively provide the sufficient flexibility for the both the covering the lever 110 along at least most of the lever's length 112 and the folding up of the flap 129 sufficiently to make the second attachment. From among the cloth, fabric or textile individually or collectively providing the sufficient flexibility is a natural substance and/or an artificial substance (such as a polymer) and/or a water-resistant or water-proof material. Thus, for example, if the flap 129 includes cloth and fabric that can be jointly credited with providing the sufficient flexibility, it may be the case that that cloth and/or fabric, which may or may not be only a part of the total cloth and/or fabric of the flap 129, is a natural substance. More generally, the flap 129 can be made up of, or partially made up of, any substance, provided the flexibility criteria are met.

The flap 129 which may include first, second, and third attachment devices 131-133 for respective attachment to the first, second and third locations 116, 118, 120 can further be configured as to dimension, placement of the third attachment device 133, flexibility between the first and third attachment devices 131, 133, and ease with which the third attachment device 133 is separable from the third location 120 in comparison to ease with which the first attachment device 131 is separable if at all from the first location 116. In particular, the configuring may be such that the flap 129 while attached to the interior side 100 at the first and third locations 116, 120 interferes with, but does not prevent, manual access by the driver 246 for the operating of the lever 110. This result comes about because laxness in the flap 129 provides a flap-to-interior-side gap 248 (shown in FIG. 5) into which a driver-side hand 249 of a driver 246 can, by motion 250 along the interior side 100 (best seen in FIGS. 1A and 1B), at least partially enter as the hand 249 approaches the lever 110. As the driver-side hand 249 proceeds forward in its motion 250 along the interior side 100 into the flap-to-interior-side gap 248, the tips of the fingers 251 roughly equate functionally to the thin-edge end of a wedge that widens and wedges open the flap-to-interior-side gap 248. The widening is to an extent that the attachment at the third location 120 is at least partially undone by the wedging force of the hand 249 moving toward the lever 110 in order to operate the lever 110. The hand 249 hypothetically cited here for this criterion has a breadth 252 in the range 2.6 to 4.0 inches across an area 254 where the fingers 251 of the hand 249 join the palm 258 of the hand 249. A large majority of human hands of adults have breadths 252 that come within the above-specified range. To hasten the undoing of the attachment at the third location 120 in case of emergency, the first and third attachment devices 116, 120 may be configured such that the attachment by the interior side 100 to the third attachment device 133 at the third location 120 is weaker than the attachment by the interior side 100 to the first attachment device 131 at the first location 116.

The first attachment device 131 may define at the first location 116, when attached to the first location 116, a first area 146 (as seen in FIG. 5) of actual attachment, i.e., the areal extent within which actual attachment occurs. The second attachment device 132 may define at the second location 118, when attached to the second location 118, a second area 148 of actual attachment. The third attachment device 133 may define at the third location 120, when attached to the third location 120, a third area 150 of actual attachment, wherein the third area 150 of actual attachment is smaller than the first area 146 of actual attachment. In this context, there might exist, around the periphery of the attachment, regions in which one or the other of the attachment device 131, 133 and corresponding location 116, 120 overextends the other so that in such regions no actual attachment occurs. Such regions are excluded from what is considered the respective area of actual attachment. Here, the region of overextension has attachment ability such as from a hook array portion, a loop array portion, magnetic material and/or material attractable by magnetism. However, the region of overextension has no mating surface of the attachment device 131, 133, or of location 116, 120, as the case may be, to mate with so as to form an attachment attributable to that region of overextension.

As seen in the figures, the third area 150 of actual attachment may be, for example, ⅙ or ⅐ of the size of the first area 146 of actual attachment.

Other factors other than or in addition to area of actual attachment may be relevant. If, for instance, the friction-based attachments are via hook and loop fasteners at the first and third locations 116, 120, the fasteners at the first location 116 may be industrial strength; whereas the fasteners at the third location 120 may be regular strength.

Or, if the attachments are magnetic at the first and third locations 116, 120, the magnet at the first location 116 may for example be thicker than the magnet at the third location 120.

Because the third attachment is weaker than the first, in the FIG. 5 embodiment, the wedging force of the hand 249 entering the flap-to-interior-side gap 248 will tend to undo the third attachment, at least to the extent of providing manual access to the lever 110, without undoing the first attachment which is intended to typically be permanent or semi-permanent. The wedging force of the hand 249 could, for example, partially or fully peel away a hook and loop fastening or pivot a magnet to weaken or break a magnetic-attraction based attachment. For either attachment method, the ease with which the separation is made will depend in part on the area over which the attachment at the third location 120 is made. It could depend also on the type of attachment, e.g., a regular as opposed to an industrial-strength hook and loop fastening or a thin as opposed to a thicker magnet.

Reaching into the flap-to-interior-side gap 248 therefore peels away the small-area third attachment which, if magnetic, is easily undone due to the relative weakness of the magnetic attraction in comparison to the stronger first attachment. The flap 129 therefore would typically interfere, but only for a brief moment, enough to command the driver's attention, or would at least, visually or tactilely, get the driver's attention or be noticed by the driver 246.

Yet, due to the brevity of that potential interference, safety is not compromised in case the passengers need to leave immediately in an emergency.

There is, moreover, no separate article to displace or stow away. Instead, the driver 246 either upon exiting the vehicle 104, or any time up until when he or she returns to the vehicle 104 with any remaining kids and is ready to leave, merely resets the in-place flap 129 conveniently to the deployed state using a simple, brief hand-movement.

In fact, if no third attachment exists or is utilized, the flap 129 may already have been in the deployed state from the moment the driver 246 exited the vehicle 104. This is because, knowing he or she would return soon with the remaining kids, the driver 246 therefore refrained from, i.e., bypassed, putting the flap 129 in the pre-deployment state 302.

Bypassing pre-deployment, as just described, is not recommended. The flap 129 is more effective if the driver 246 goes through the motion each time he or she returns to the driver seat of re-deploying the flap 129. Re-deployment at the outset of the trip, rather than beforehand, contributes to preventing the tactile and visual reminder, i.e., flap 129, from becoming routine to the point where it might fail to get the driver's attention upon his or her exit from the vehicle 104.

If, on the other hand, a third attachment device 133 exists and is utilized, the flap 129 may, likewise although it is not the recommended protocol, be re-deployed immediately after operating the lever 110 when exiting the vehicle 104, the driver 246 knowing he or she would return soon with the remaining kids, the driver 246 therefore refraining from putting the flap 129 in the pre-deployment state 302.

Particularly at the point when the driver 246 is seated and ready to leave, the driver 246 may be incentivized to deploy the flap 129 in part in order to release a pleasant scent into the vehicle 104. This is discussed immediately herein below. The deployment would proceed from the pre-deployment state 302, which is the recommended course, as discussed herein above.

Figure 7:
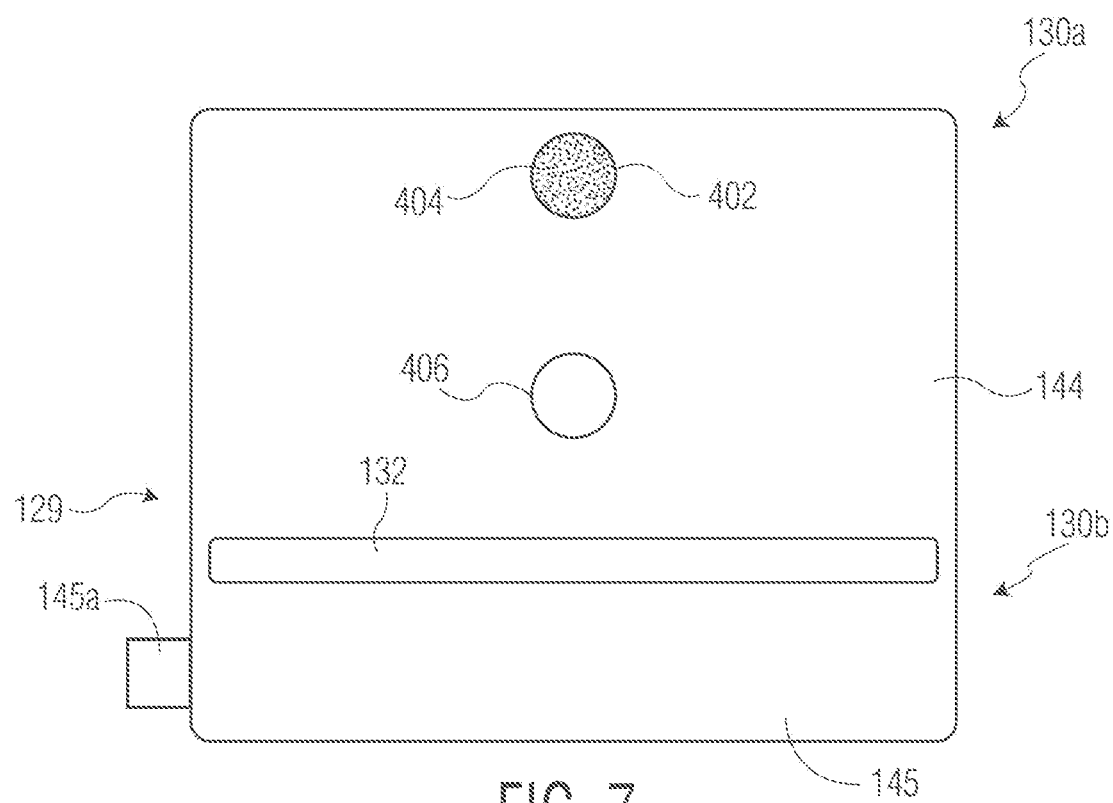
FIG. 7 is a schematic view of the second attaching side of an exemplary hanging flexible flap enhanced for, when deployed, releasing scent in accordance with aspects of what is proposed herein.

With reference to the sample embodiment in FIG. 7, the flap 129 includes toward its top end 130*a* a shallow container 402 mounted on the second attaching side 144. The container 402 is designed to contain a scented material 404, such as cotton or gauze that has absorbed perfume, air freshener, or other scented liquid. Further toward the bottom end 130*b*, a lid 406 is mounted on the same second attaching side 144. Alternatively, the locations of the container 402 and the lid 406 could be reversed, i.e., with the lid 406 at or nearer the top end 130*a*. The container 402 and the lid 406 are placed relative to each other so that, in the folded-up configuration 304, the lid 406 is aligned to be manually pressed in so as to seal the container 402 with the lid 406, the lid 406 albeit being loosely fitted so that it can be easily removed (i.e., in deploying the flap 129, the lid 406 is easily manually separated from the container 402). Deploying the flap 129, starting from the pre-deployment state 302, releases the scent, thereby rewarding the driver 246 and other occupants of the vehicle 104 for remembering to deploy the flap 129. The container 402 and the lid 406 may both be made of plastic or a light metal such as aluminum and can be attached to the second attaching side 144 by permanent adhesive. The container 402 and the lid 406 may be positioned so that they are: a) releasably co-joinable upon the sufficient folding up; and b) mutually releasable in the covering of the lever 110 along at least most of the lever's length 112. The cotton or gauze in the container 402 can easily be replenished with perfume, car air freshener liquid, etc.

An end portion 145, which may include a graspable tab 145*a* as seen in FIG. 7, can exist at the very end of the bottom end 130*b* of the flap 129. The end portion 145 makes deployment of the flap 129 from the pre-deployment state 302 (shown in FIG. 6) easier. By manually grasping the end portion 145, the second attachment (or third attachment) can easily be undone. The tab 145*a* can be located vertically at and/or below the level of the third attachment device 133, the latter being best seen in FIGS. 4A and 4B. Locating the tab 145*a* at this level allows the driver 246 to better direct the pulling force in manually undoing the third attachment. The tab 145*a* can be laterally disposed on the side of the flap 129 rearmost with respect to the vehicle 104; alternatively, the tab 145*a* could be located on the other side of the flap 129, or tabs could exist on both sides. Any of these tabs 145*a* may have on it an icon or picture (not shown). This visual design can exist on the tab's side that is visible in FIG. 7, or on the opposite side as would be visible to the driver 246 in the pre-deployment state 302. The tab 145*a* can be sewed on or otherwise affixed. If no end portion 145 exists, the flap 129 can be grasped from the side at the bottom end 130*b*.

For the FIG. 7 embodiment, the amount of scented liquid maintained in the container 402 typically would be enough to appeal to and therefore remind the driver 246, and yet not so much as to overwhelm him or her with the scent.

As another incentivizing feature, the child passengers may be "recruited" in getting the flap 129 deployed. As seen from the example shown in FIG. 8, a zippered pocket 408 is attached to the second attaching side 144. The zippered pocket 408 may be mounted onto the flexible body 134 (which may be for example one- or two-layered and is best seen in FIG. 3A) of the flap 129. Working on the same principle, the flap 129 is deployed to get the reward. Often, one of the last acts before heading out in the vehicle 104 is to buckle in the children and open the driver-side front door 102. If the children are typically or regularly given a pacifier or other treat, or sticker, stored in the zippered pocket 408 at this time, they may when not right away receiving the treat or sticker remind the driver 246. The driver 246 will therefore remember, in proceeding to fulfill their request, to deploy the flap 129. The zippered pocket 408 need not be oriented vertically. It could instead be slanted, for instance. Nor is it necessarily designed to hold the above-mentioned items. It could hold, for example, a seat belt cutter, a medical card, a spare key, or a house key. The zippered pocket 408 can be opened conveniently with the same hand that deploys the flap 129. Other forms of opening and closing a pocket, such as by snaps, may be used instead of a zipper. Also, a pouch may be implemented instead of the zippered pocket 408. The pouch might have a flap for closing the pouch.

Figure 9:
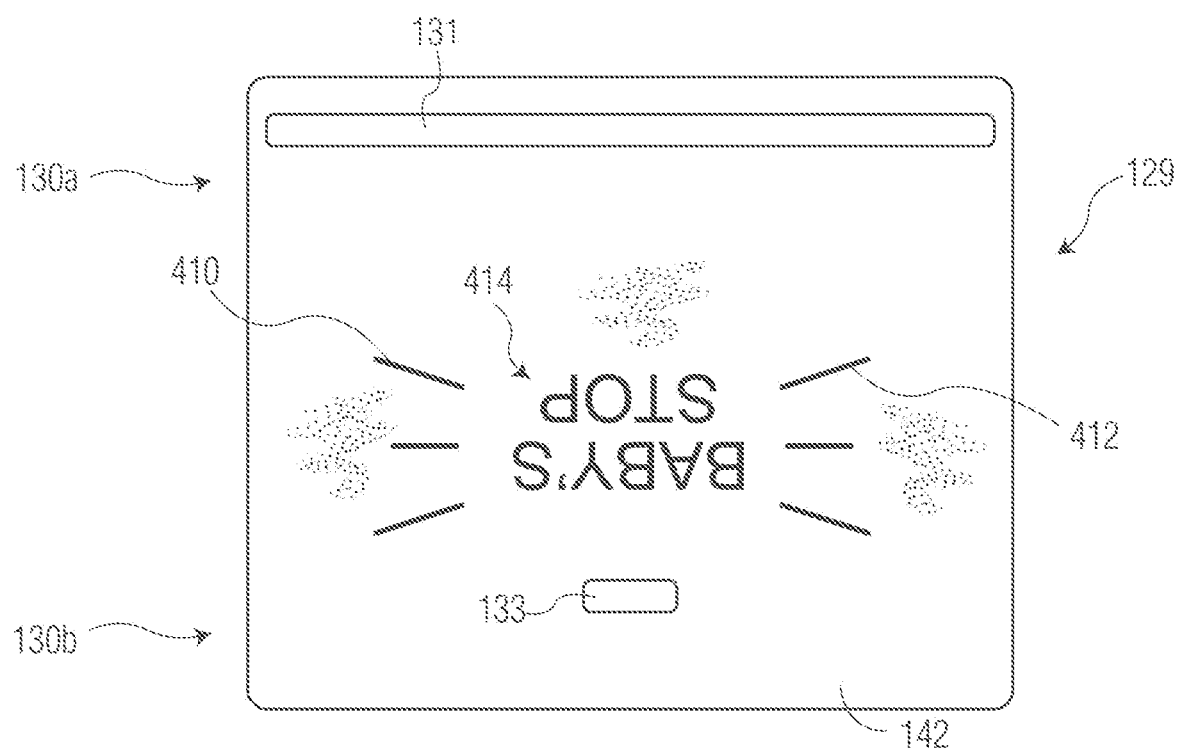
FIG. 9 is a schematic view of the first attaching side of an exemplary hanging flexible flap enhanced by providing luminescent material in accordance with aspects of what is proposed herein.

As a further way to remind the driver 246 to deploy, the first attaching side 142 can contain, to attract the attention of the driver 246, a fluorescent substance, a phosphorescent substance, or both a fluorescent substance and a phosphorescent substance, as seen in the sample embodiment of FIG. 9. For simplicity of demonstration, the hidden lines are not shown in FIG. 9. To the surface on the first attaching side 142 a substance may be applied. Examples include paint that is phosphorescent 410 or fluorescent 412, invisible ink which contains chemical compounds that are fluorescent 412, and phosphorescent flakes or chips either of which can be glued onto the flap 129. Non-toxic fluorescent and phosphorescent substances are available. The first attaching side 142 is hidden once the flap 129 is deployed but is visible to attract attention when the flap 129 is in the pre-deployment state 302. A caption 414 or picture on the first attaching side 142 may be added to draw the attention of the occupants of the vehicle 104 to the flap 129 in the pre-deployment state 302. In the pre-deployment state 302, the flap 129 is in a folded-up configuration 304. Therefore, the caption 414, if it were to be shown in FIG. 9 as an upside-down version of "BABY'S STOP", would, in the pre-deployment state 302 be upright so that "BABY'S STOP" would be easily readable. Correspondingly, phosphorescent 410 and fluorescent 412 material if used would typically be placed on a portion of the flap 129 that is located above the fold line 244 (best seen in FIG. 6) while the flap 129 is in the pre-deployment state 302 and which is therefore visible by the driver 246 at that time.

Figure 8:
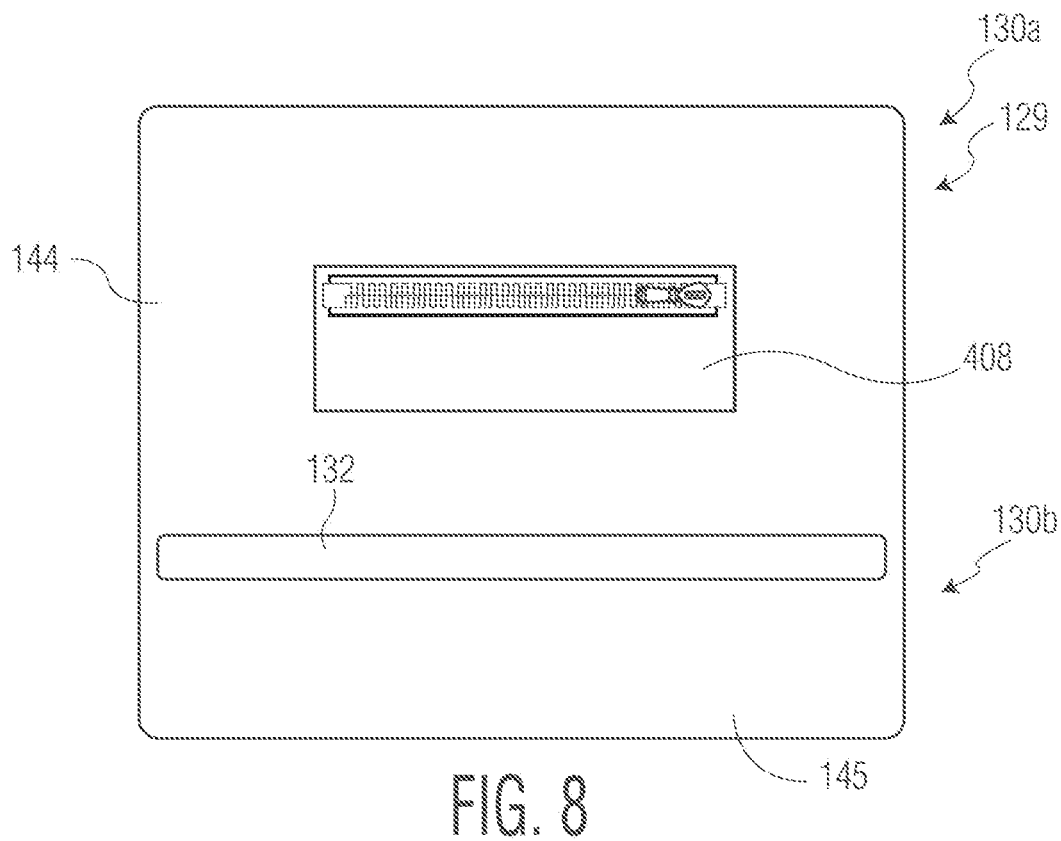
FIG. 8 is a schematic view of the second attaching side of an exemplary hanging flexible flap enhanced by being provided with a zippered pocket in accordance with aspects of what is proposed herein.

Any one or more of embodiments represented in FIGS. 7 through 9 are combinable. For example, the zippered pocket 408 could be placed more to the left to make room for a rightwardly shifted container 402 and lid 406.

Figure 10:
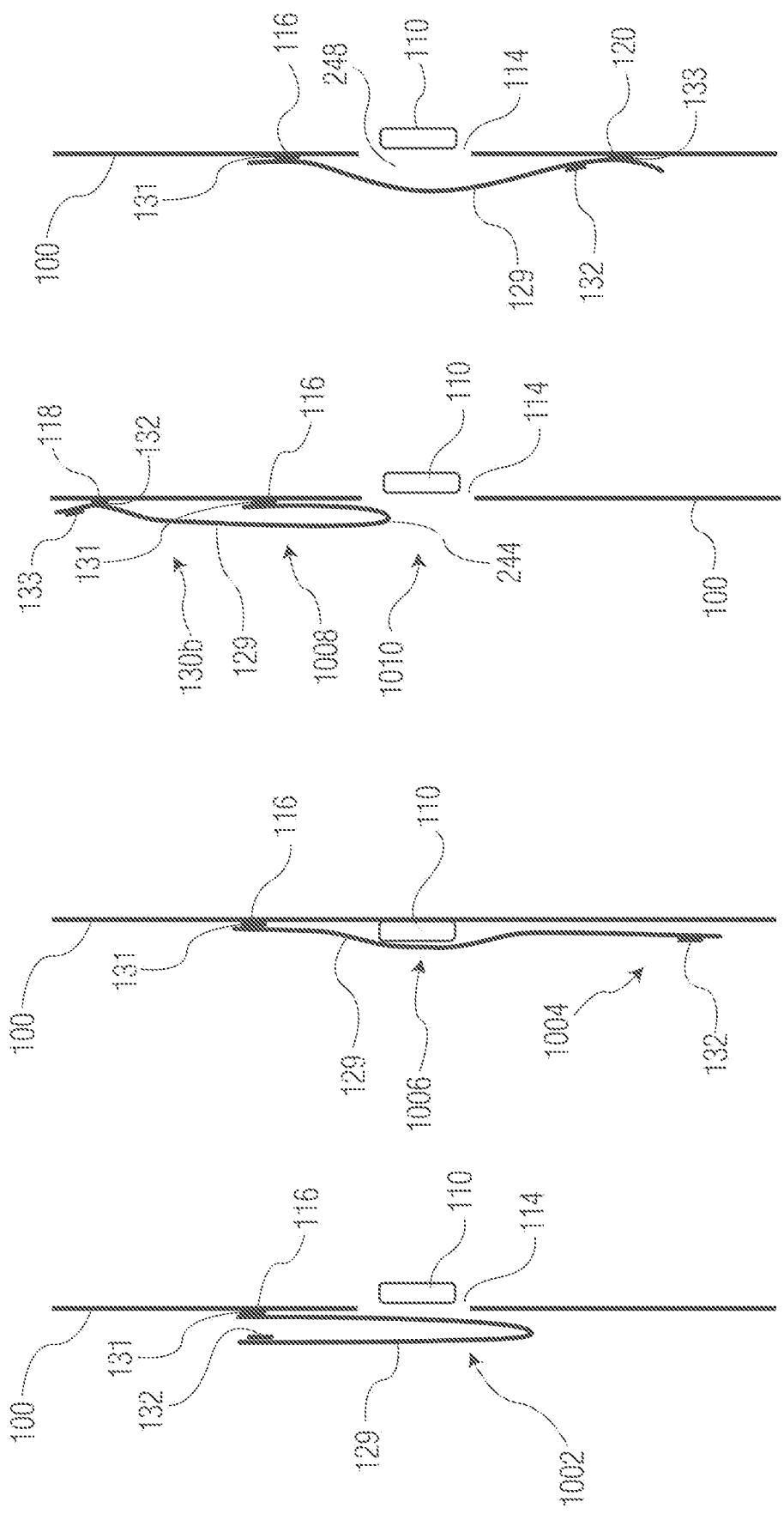
FIGS. 10A, 10B, 10C, and 10D are side views of the driver-side front door's interior side with a hanging flexible flap attached in various configurations in accordance with aspects of what is proposed herein.

Initially, and with reference to FIG. 10A, the flap 129 may be dimensioned, configured as to placement of the first and second attachment devices 131, 132, and sufficiently flexible between the first and second attachment devices 131, 132 to allow the following. With the attachment of the flap 129 by the first attachment device 131 to the interior side 100 being at a first location 116 on the interior side 100 which is vertically above 117 the lever 110, the flap 129 can be folded up 1002. As an example, the lever 110 can be mounted within the recessed compartment 114. The attachment devices 131, 132 are portrayed as VELCRO brand strips, but could be magnetic or attractable by magnetism.

In addition, the flap 129 is dimensioned, configured as to placement of the first and second attachment devices 131, 132, and sufficiently flexible between the first and second attachment devices 131, 132 to allow the following. As depicted in FIG. 10B, with the attachment of the flap 129 by the first attachment device 131 to the interior side 100 being at a first location 116 on the interior side 100 which is vertically above 117 the lever 110, the flap 129 can hang down 1004 to cover 1006 the lever 110 along at least most of the lever's length 112. The flap 129 may bulge internally into the vehicle 104 around the lever 110 if the lever 110, rather than residing in a recessed compartment 114, projects into the vehicle's interior.

The flap 129 is also dimensioned, configured as to placement of the first and second attachment devices 131, 132, and sufficiently flexible between the first and second attachment devices 131, 132 so as to result in the following as shown in FIG. 10C. Folding up 1008, by the bottom end 130*b*, the flap 129 covering the lever 110 to uncover 1010 the lever 110 and then releasably attaching the bottom end 130*b* to the second location 118 folds the flap 129 up sufficiently such that the lever 110 is not covered along at least most of the lever's length 112 (best seen in FIG. 1A). The folding up 1008 creates the fold line 244 (as shown in FIG. 6) and lifts it vertically upward.

The configuring of the flap 129 can be done based on a pre-positioning of the first and second locations 116, 118 and, if the third location 120 exists, the third location 120 which is shown in FIG. 1A. Such a pre-positioning that sets the locations 116, 118, 120 is demonstrated herein above in connection with FIG. 2. Alternatively, the configuring of the flap 129 can be done in conjunction with positioning the first and second locations 116, 118 and, if the third location 120 exists, the third location 120. The configuring, whether done in conjunction with or after the positioning (or "setting") of the locations 116, 118, 120, can consider the shape, size, and orientation of outer surfaces of the interior side 100.

If a third attachment is to exist, as seen from FIG. 10D which provides a side view of the shape of the flap 129 as deployed in FIG. 5, the flap 129 may still further be configured at this initial stage as to size, placement of the third attachment device 133, flexibility of the flap 129 between the first and third attachment devices 131, 133, and case with which the third attachment device 133 is separable from the third location 120 in comparison to case with which the first attachment device 131 is separable if at all from the first location 116. This still further configuring may be such that the flap 129 while attached at the first and third locations 116, 120 interferes with, but does not prevent, manual access by the driver 246, shown in FIG. 5, for operating the lever 110 when the driver 246 is about to exit the vehicle 104. The manual access afforded by the flap-to-interior-side gap 248 is discussed in further detail herein above.

Any of the individual or concurrent considerations as to flexibility can point toward use of, for instance, a supple flap non-resilient to bending.

The attachment devices 131-133 themselves can also be configured as to relative strength of attachment to the interior side 100, as discussed herein above.

Figure 11:
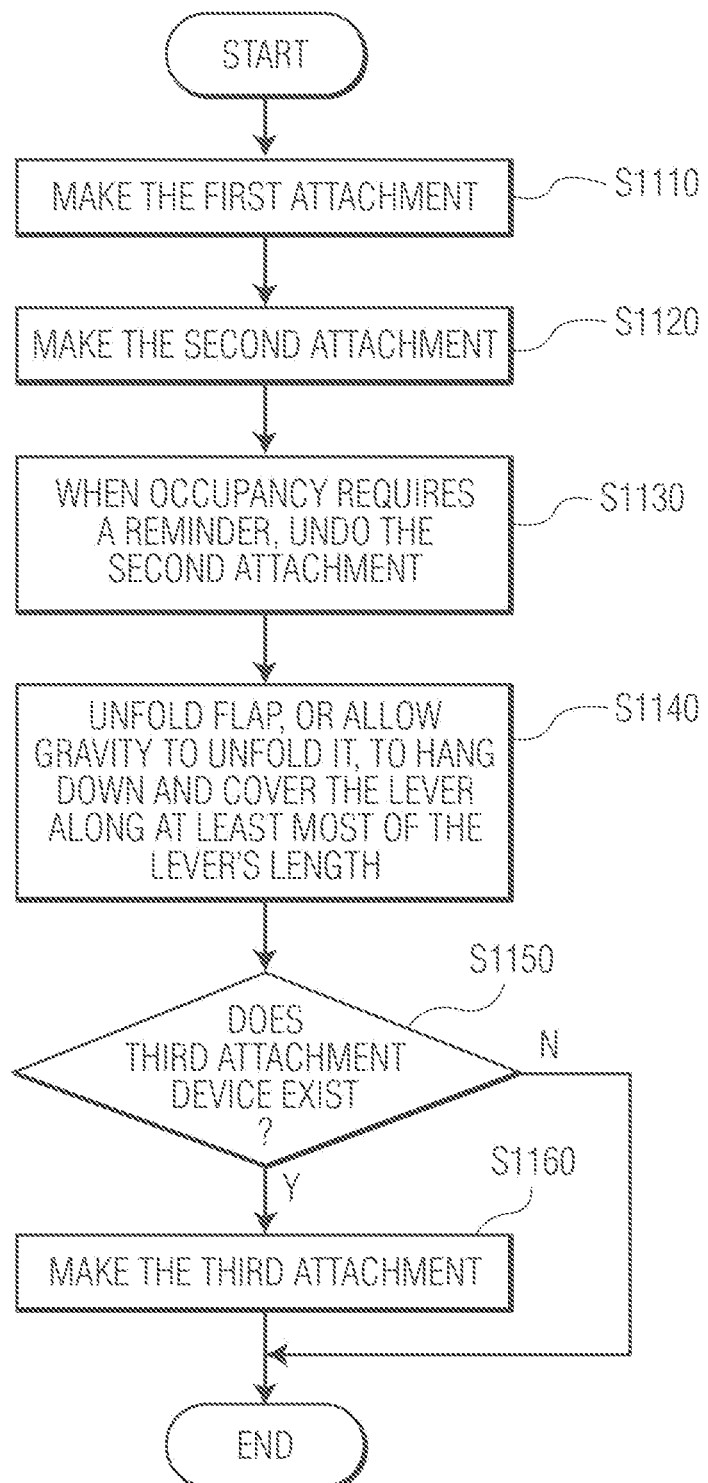
FIG. 11 is a flow chart on an example of preparing for deployment of a hanging flexible flap and deploying in accordance with aspects of what is proposed herein.

An example of a method of using the flap 129 includes, as shown in FIG. 11, making the first attachment (step S1110), i.e., by attaching the first attachment device 131 to the first location 116. The second attachment, which like the third attachment is releasable, is made (step S1120). It is possible to make the second attachment before the first attachment is made. It is also possible when initially attaching the flap 129 for use in the vehicle 104 to forego pre-deployment, so that the flap 129 is not folded up when you intend to deploy for the first time. Pre-deployment may be foregone also, as mentioned herein above in an exemplary embodiment, upon departing the vehicle 104 knowing that you will return with the remaining kids who need to be dropped off at one or more destinations. In any event, when occupancy warrants a reminder, the second attachment is undone (step S1130). The reminder is warranted when, for example, you have one or more children or elderly to take to, or drop off at, the upcoming destination, and especially if this is the first destination of the trip. After undoing the second attachment, the flap 129 is unfolded, or gravity is allowed to unfold it, to hang down and cover the lever 110 along at least most of the lever's length 112 (step S1140). If a third attachment device 133 exists (step S1150), the third attachment is made (step S1160). Therefore, the flap 129 is now deployed, whether or not a third attachment device 133 exists. The flap 129 may be re-deployed as the driver 246 exits the vehicle 104, because the driver 246 expects to be reminded about one or more passengers when he or she next heads out and arrives at a destination. Or the flap 129 can be, for instance and as recommended herein above, re-deployed as the standard next step after buckling in one or more children in their child seat(s). That is, after each stop for example, the parent returns with the remaining kids, buckles them in, and then re-deploys the flap 129.

Figure 12:
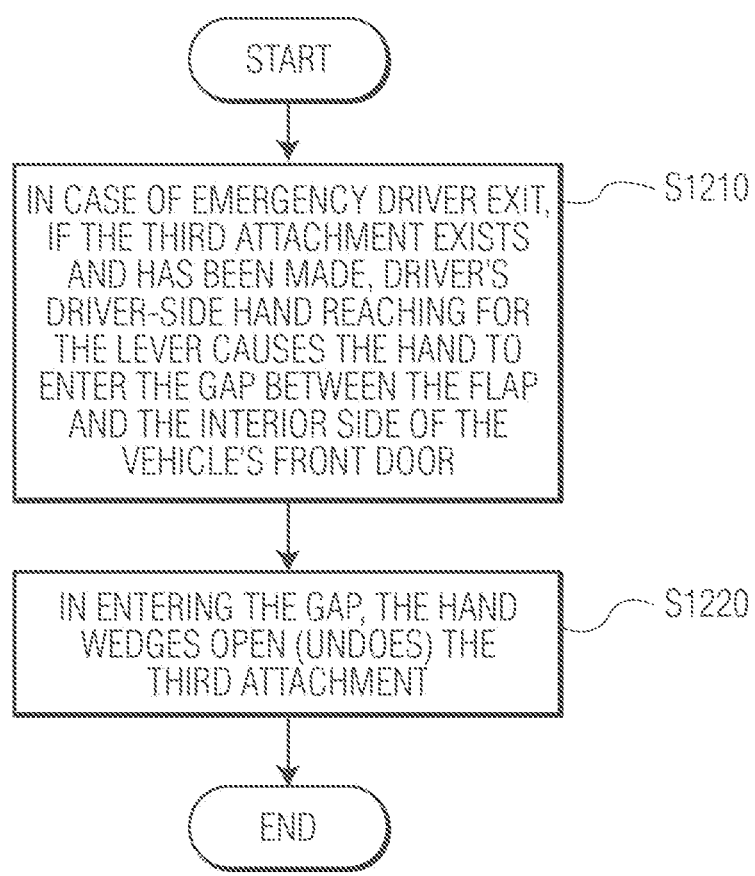
FIG. 12 is a flow chart on exemplary methods of using a hanging flexible flap in accordance with aspects of what is proposed herein.

In case of an emergency exit from the vehicle 104 by the driver 246, if the third attachment exists and has been made, driver's driver-side hand 249, as shown in FIG. 5, reaching for the lever 110 causes the hand 249 to enter the flap-to-interior-side gap 248 between the flap 129 and the interior side 100 of the vehicle's front door. Therefore, as seen in FIG. 12, if the third attachment exists and has been made, the innovative flap 129 does not, during emergency exit, prevent or for more than a brief moment slow down the exit (step S1210). In entering the flap-to-interior-side gap 248, the hand 249 may wedge open (i.e., undo) at least in part the third attachment (step S1220). The flap 129 therefore reminds the driver 246 to check for occupancy.

The instant invention provides a simple and efficient way of addressing the gas station stop enroute situation mentioned further above. In accordance with an aspect of the present invention, when you stop enroute for gas and get out to fill up the gas tank, you will undo the second attachment, but you are unlikely to put the flap 129 in a pre-deployment state 302. Therefore, the flap 129 will still, even if you do not re-deploy, hang over and tactilely and visually block the lever 110 for the rest of your trip. That is, the flap 129 will still carry out its reminder function with a significant degree of effectiveness. What is more, there is, at the gas station stop, no door alarm, rush to disable the alarm, or any extra opening and closing of passenger doors.

There are times, too, when you, in starting out on your trip, open the back door not for passengers but to load the car with something you want to take with you on the trip. When you arrive at your destination, you would likely want to avoid having a strictly door sensor/alarm reminder sound an inconvenient alarm unless you intend to unload from the back immediately.

With the motion detector, there are, as mentioned above, the issues of possible electrical malfunction, a spent system-dedicated battery, and remembering to re-set the system after retrieving the car from the shop after maintenance. It also is more expensive than the flap 129. For the above reasons, even if an electronic approach were to gain acceptance, one would be well-advised to use a manual reminder such as the flap 129 with the electronic system possibly serving as a backup.

Advantageously, the flap 129 is a low-cost, mechanical, effective, and convenient solution. With the "in-place", resettable flap 129, no decision need be made about where in the vehicle 104 to place a reminder for next time so that you do not forget it and yet it is not inconveniently in the way for all of the times you do not need a reminder. The flap 129, by virtue of the third attachment, does not distract the driver 246 while he or she is driving by, for example, moving back and forth against the driver's arm, and, even without the third attachment, the flexible fabric is less noticeable and less likely to distract than existing devices. Nor does the flap 129 obstruct the driver 246 during his/her emergency exit from the vehicle 104. The flap 129 with a single hand-movement folds away "in-place" after use, but still visually serves as a reminder to reset it as an "exit interference" reminder.

For those who prefer a reminding device that better blends into the décor of the vehicle's passenger compartment (although an eye-catching baby-reminder tag can be attached), there is another version of a reminder-equipped driver-side door. In this version, the hanging flexible flap, of plastic or fabric for example, in a pre-deployment state is visible merely as a graspable ridge, made of plastic or aluminum for example, adjoining and just underneath the inside window sill of the driver-side front door. The ridge is a retaining device. It is attached to and can retain the flap in a deployed state. In this context, the ridge can manually be pulled down vertically below the lever, thereby drawing the flexible flap into position for deployment. Conversely, the ridge can, when the flap is in a pre-deployment state, retain the flap for easy manual access, as will be become clear from the discussion below.

Figure 13A:
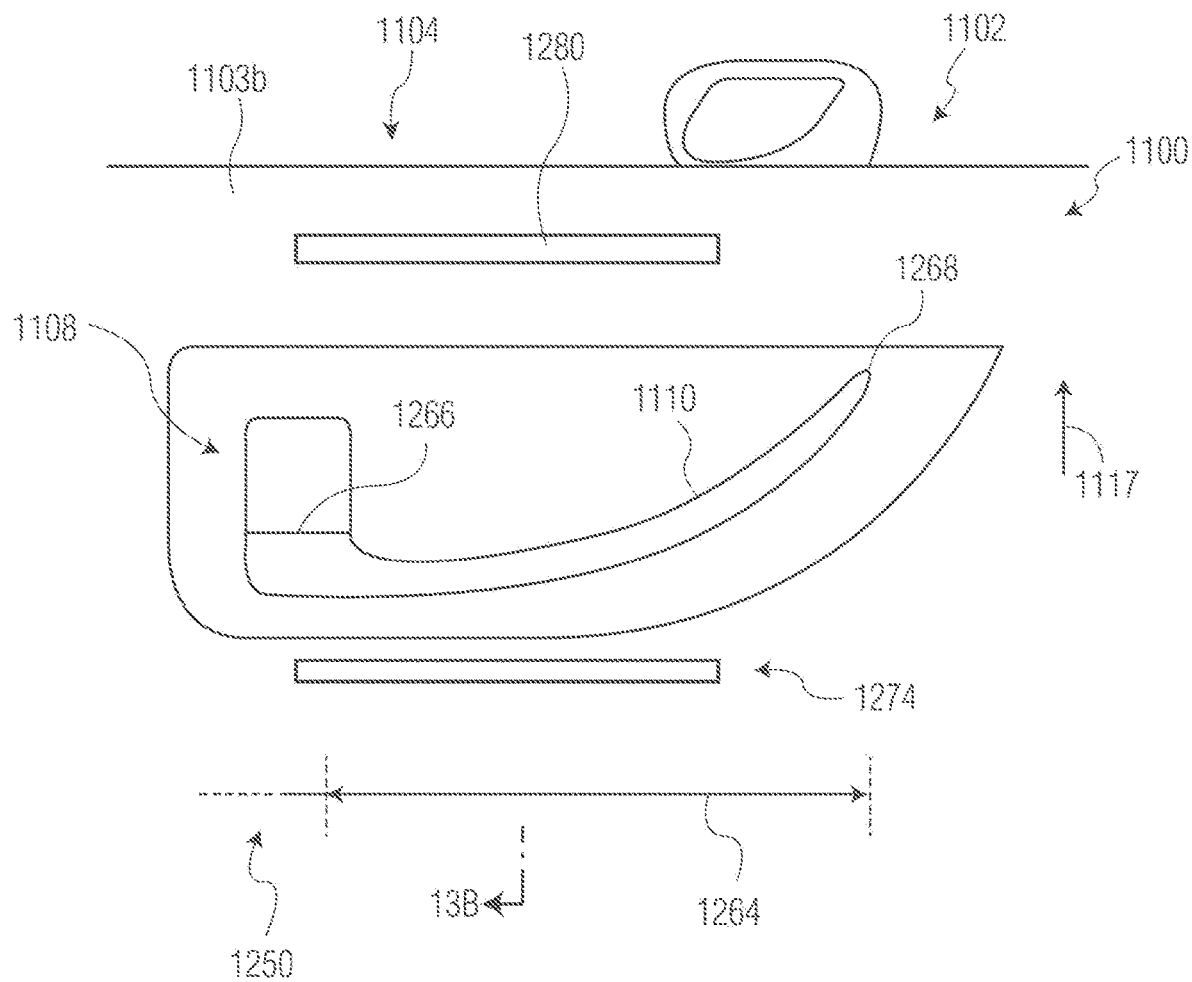
FIG. 13A is a schematic view at a small perspective angle of a vehicle door designed for extension and retraction of a hanging flexible flap with the flap in a pre-deployment state in accordance with aspects of what is proposed herein.
Figure 13B:
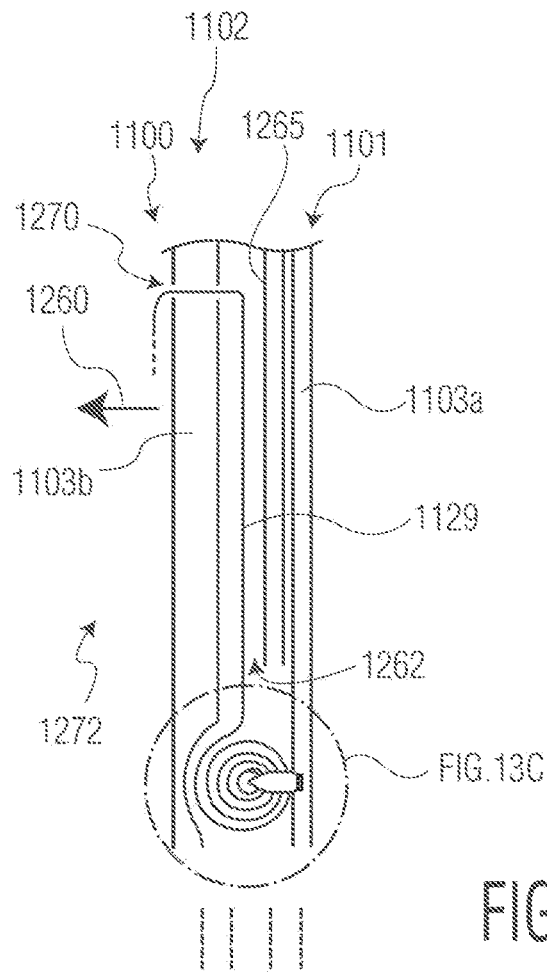
FIG. 13B is a side view of the vehicle door and flap of FIG. 13A.
Figure 13C:
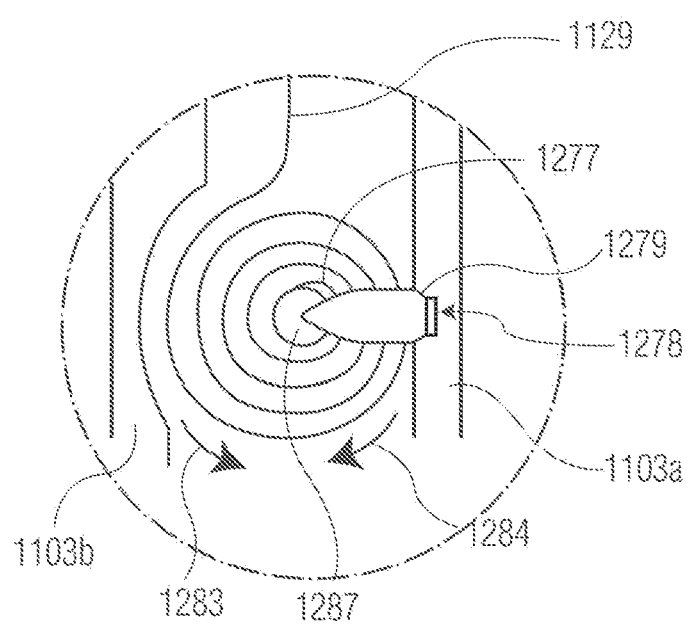
FIG. 13C is a partial, expanded view of the retracted part of the flap of FIG. 13B that is wound around a revolvable spindle.
Figure 14A:
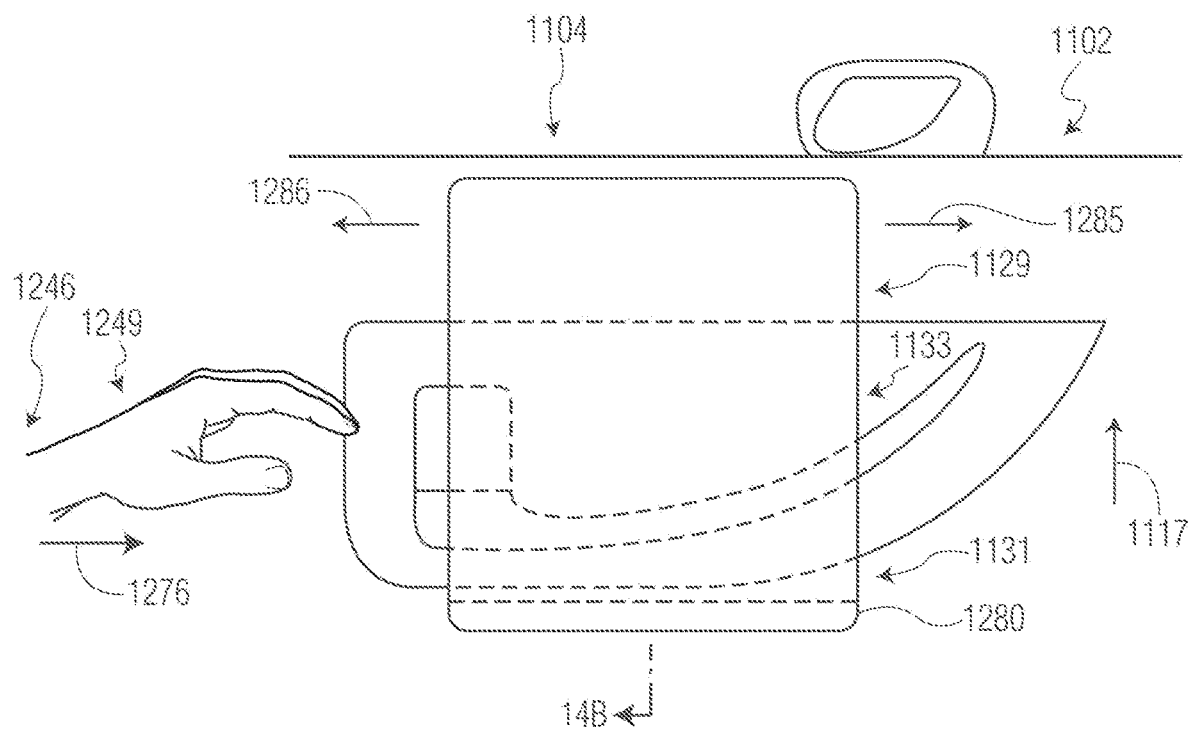
FIG. 14A is the image of FIG. 13A, except that the flap has now been deployed, the image including, in addition, the hand of the exiting driver reaching for, but being impeded from accessing, the vehicle handle's lever.

More specifically and with reference to FIGS. 13A, 13B, 13C, 14A and 14B, a vehicle 1104 includes a reminder-equipped door 1102 that has an interior side 1100 and an exterior side 1101, the reminder-equipped door 1102 including: a vehicle door frame 1103a; a vehicle door panel 1103b on the interior side 1100 and assembled on the vehicle door frame 1103a; and a door handle 1108 manually accessible on the interior side 1100 to the driver 1246 (as seen in FIG. 14A) and operatively connected to the vehicle door frame 1103a for opening the door 1102. Typically, the connection is a mechanical one to a part of the vehicle door frame 1103a that grasps the vehicle frame when the door 1102 closes and that disengages from the vehicle frame by virtue of leverage applied via a lever 1110 which is part of the door handle 1108.

The door 1102 further includes a hanging flexible flap 1129 (best seen in FIG. 14A) for hanging down over the lever 1110 to, horizontally 1260, at least partially cover, and thereby impede the driver's manual access 1276 to, the lever 1110—this serves as a reminder to the driver 1246 upon the driver 1246 exiting the vehicle 1104.

The flap 1129 may be retractable into a flap passageway 1262 for storage and may, for vertical extension, be drawable from the flap passageway 1262 for the covering of the lever 1110. For this purpose, the flap passageway 1262 has, vertically above 1117 the lever 1110, an opening 1270 such as a slit into a passenger compartment 1272 of the vehicle 1104. The interior side 1100 has a flap-retaining site 1274 disposed vertically below the lever 1110.

The flap 1129 has an internal end 1277 (as seen in the expanded view provided in FIG. 13C) and an external end 1131 (shown in FIG. 14A) and, between the internal and external ends, 1277, 1131, a flexible portion 1133.

The flap 1129 is, at the internal end 1277, fixed to an anchor 1278. The anchor 1278 can include a revolvable spindle 1287 around which the flap 1129 winds 1283 during the retraction and from which the flap 1129 unwinds 1284 during the vertical extension.

Figure 14B:
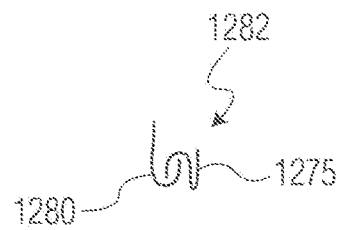
FIG. 14B is a partial side view of the image of FIG. 14A.

In the embodiment depicted, the anchor 1278 includes a horizontal bracket 1279 fixed to the vehicle door frame 1103a; a fixed axis (not shown) supported on both ends by the horizontal bracket 1279; and, surrounding the fixed axis, the revolvable spindle 1287. Part of the retracted portion of the flap 1129 is wound around the revolvable spindle 1287 which is biased to retract the flap 1129. The anchor 1278 keeps the flap 1129 at least partially within the flap passageway 1262. A retracted portion 1265 of a vehicle door window (retracting mechanism not shown) may be disposed within the flap passageway 1262. The flap 1129 has, at the external end 1131 (shown in FIG. 14A), a retaining device 1280 for releasably engaging 1282 the flap 1129 at the flap-retaining site 1274. The flap-retaining site 1274 may have for this purpose, as seen in FIG. 14B, a hook 1275 which can engage the flap 1129 via the retaining device 1280. Disengaging the hook 1275 may entail initially pulling down slightly on the flap 1129. The flap 1129 can be said to be "deployed" when releasably engaged 1282 in this manner. The flap 1129 may be dimensioned long enough to, when deployed, still be pulled out a bit more from the opening 1270. This gives the flap a little slack if, in an emergency, the driver 1246 reaches within the clearance (i.e., flap-to-interior side gap) between the flap 1129 and the interior side 1100 to grab the lever 1110 for making an emergency exit. The driver-side hand 1249 of the driver 1246 squeezing into the clearance causes the flap 1129 to be pulled further out from the opening 1270. Keeping the horizontal 1260 width of the flap 1129 relatively small also helps in this situation to ease the driver's manual access 1276 in an emergency. Undoing the engagement allows the flap 1129 to retract.

The revolvable spindle 1287 can be configured as a spring biased roller used in many roller shades. The internally-mounted spring (not shown) causes the retraction. In particular and as an example, a helical torsion spring may reside concentrically between the revolvable spindle 1287 and the fixed axis. It can have one end attached to the revolvable spindle 1287 and the other end attached to the fixed axis. Unwinding 1284 the flap 1129 from the revolvable spindle 1287 twists the spring thereby biasing the spring to exert force for rewinding the flap 1129. This force rewinds the flap 1129 if the force is unopposed as by countervailing manual force by the driver 1246 in holding or pulling the retaining device 1280 or by the holding force provided by the hook 1275.

The spring bias force can be kept small by adjusting the size of the spring or its material for example, so that the flap 1129 is, when held by the hook 1275, relatively loose thereby allowing the driver's hand 1249 to wedge into the resulting flap-to-interior-side gap during an emergency exit. To ease the driver's manual access 1276, horizontal overextension 1250 if any of the flap 1129 can also be minimized.

As an alternative to using the revolvable spindle 1287 and retracting the flap 1129, the flexible portion 1133 can be pushed (as by the driver 1246 manually via the retaining device 1280) through the opening 1270, provided the flexible portion 1133 rather than being entirely supple has a sufficient amount of stiffness. A flexible plastic with sufficient stiffness would be an example. In this case, the flap passageway 1262 would be designed with sufficient volume to take up the flap 1129. This might involve sufficient width if the flap folds in a zigzagging manner.

To achieve a pre-deployment state (as seen in FIG. 13A), the retaining device 1280 returns to its starting location, for example adjoining and just below the window sill. The retaining device 1280 retains the flap 1129 in the deployed state (as seen in FIGS. 14A and 14B), and in the pre-deployment state (as seen in FIG. 13A) by keeping the flap 1129 from retracting completely within the vehicle door 1102. A short banner decorated as with the caption 414 (as seen in FIG. 9) may be attached to hang from the retaining device 1280 as a reminder to deploy. The banner could be made of cloth for example.

The lever 1110 has both a pivot point 1266 at a fulcrum, and an effort endpoint 1268, i.e., the point on the lever 1110 at which the driver 1246 could directly apply force for the maximum leverage. The lever 1110 has a horizontal extent 1264 which is equal to the horizontal 1260 distance between the pivot point 1266 and the effort endpoint 1268.

The flap 1129 is horizontally 1260 dimensioned to, when releasably engaged at the flap-retaining site 1274, cover at least most of, with reference to FIG. 13A, the horizontal extent 1264 of the lever 1110 but not to, in total taking into account both sides (i.e., the front side 1285 and the rear side 1286), overextend the lever 1110 horizontally 1260 by more than 50 percent. Horizontal overextension 1250 if any of the flap 1129 may be, in total taking into account both sides 1285, 1286, no more than 25 percent. Or it may, for example, be no more than 10%.

Minimizing the horizontal overextension 1250, if any, is another factor, along with minimizing spring bias, that facilitates the driver's emergency exit from the vehicle 1104. Firstly, horizontal overextension 1250 may contribute to spring bias, because spring bias force is needed all along the width of the flap 1129. Second, horizontal overextension 1250, if lessened on the rear side 1286, makes emergency exit easier, because the driver's manual access 1276 is from the rear side 1286. Covering, on the rear side 1286, the lever 1110 along less than its horizontal extent 1264 likewise makes emergency exit easier for the same reason.

For a hanging flexible flap having a top and bottom end for reminding a driver, upon exiting, of the vehicle's occupancy for a vehicle having a driver-side door handle including a lever operable for opening the door, deployment, proceeding from a pre-deployment state in which the flap is in a folded-up configuration such that: a) the bottom end is releasably attached to a second interior-side location vertically above a first interior-side location to which the flap is attached; and b) both locations are vertically above the lever and jointly high enough that the flap does not cover the lever along at least most of the lever's length, includes undoing the releasable attachment; and then unfolding the flap, or letting it fall, to hang down so as to cover the lever along at least most of the lever's length. Alternatively, pre-deployment may be in a spring-biased rolled-up configuration, with the flap unrollable down to releasably engage a hook so as to remain in position, covering at least most of the lever's horizontal extent.

While the invention has been illustrated and described in detail in the drawings and foregoing description, such illustration and description are to be considered illustrative and exemplary and not restrictive; the invention is not limited to the disclosed embodiments. For example, the embodiment of FIG. 9 may use reflective tape or other reflective substance on the first attaching side 142 of the hanging flexible flap 129 to make the flap 129 while in the pre-deployment state 302 more conspicuous. Also, the hanging flexible flap 129 serving as reminder to the driver 246 exiting the vehicle 104 may be used to remind the driver 246 to turn off the headlights, or about something else, and is not limited to reminding the driver 246 about occupancy. In addition, as a further example, the hanging flexible flap 129 may serve as a backup to an electrical baby-reminder system, or vice versa. In particular, consider such a system that uses a hand-approach sensor near the lever 110, and a backseat weight-support sensor. The sensor(s) may at the moment the driver 246 exits be inactive due to, for instance, an electrical short, a spent reminder-function-dedicated battery, or forgetting to reset the sensor(s) after vehicle servicing. Or the sensor(s) may intentionally have been temporarily inactivated due to the need for system repair or adjustment.

Other variations of the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The word "exemplary" is used to mean "serving as an example, instance or illustration." Any embodiment described as "exemplary" is not necessarily to be construed as preferred or advantageous over other embodiments and/or to exclude the incorporation of features from other embodiments.

The mere fact that certain measures are recited in mutually different dependent claims does not indicate that a combination of these measures cannot be used to advantage.

What is claimed is:

1. A driver-side door of a vehicle, the door designed to be opened by a driver of the vehicle, wherein the door has an interior side having an outer surface, the door comprising:
   a vehicle door frame;

a vehicle door panel on said interior side and assembled on the vehicle door frame;

a door handle manually accessible on said interior side to the driver and operatively connected to the vehicle door frame for opening the door, the door handle including a lever operable by the driver for opening the door to exit the vehicle;

as part of said interior side, a first horizontal strip of material, said first horizontal strip of material being disposed at a location vertically above the lever;

as part of said interior side, a second horizontal strip of material, said second horizontal strip of material being disposed at a location vertically above the first horizontal strip of material; and as part of the interior side, vertically below the lever, third-location material having opposite sides, one of two opposite sides facing away from the driver, the other of the two opposite sides being a flat surface facing the driver and oriented substantially parallel to or substantially flush with a surrounding portion of the outer surface of the interior side, at least part of the third-location material being either magnetic or attractable by magnetism, wherein an intervening gap which is the shortest connecting straight line between the first and second horizontal strips of material is a first separating-distance that is no more than 4 inches.

2. The driver-side door of claim 1, wherein at least part of the first horizontal strip of material is either magnetic or attractable by magnetism; and wherein at least part of the second horizontal strip of material is either magnetic or attractable by magnetism.

3. The driver-side door of claim 1, wherein the first horizontal strip of material, the second horizontal strip of material, and the third-location material are located such that, between any two of the three, any intervening gap which is the shortest connecting straight line is a second separating-distance that is no more than 8 inches.

4. A reminder-equipped driver-side door comprising:
the driver-side door according to claim 1; and
a hanging flexible flap non-resilient to bending and having a top end and a bottom end;
wherein the hanging flexible flap is, at said top end, attached to the first horizontal strip of material, and wherein the hanging flexible flap is, at said bottom end with the attachment at said top end being retained, attachable alternately: to assume a pre-deployment state, to the second horizontal strip of material; and, in being deployed as a reminder to the driver upon the driver exiting the vehicle, to the third-location material.

5. A vehicle comprising the driver-side door of claim 1.

* * * * *